United States Patent
Eskowitz

(10) Patent No.: US 11,639,984 B2
(45) Date of Patent: May 2, 2023

(54) RADAR SYSTEM AND METHOD USING ANTENNA CORRELATION AND COVARIANCE EIGENVALUES IN RADAR SENSOR BLOCKAGE DETERMINATION

(71) Applicant: Veoneer US, LLC, Southfield, MI (US)

(72) Inventor: Michael Eskowitz, Tewksbury, MA (US)

(73) Assignee: Veoneer US, LLC, Southfield, MI (US)

(*) Notice: Subject to any disclaimer, the term of this patent is extended or adjusted under 35 U.S.C. 154(b) by 226 days.

(21) Appl. No.: 16/883,102

(22) Filed: May 26, 2020

(65) Prior Publication Data

US 2021/0373125 A1 Dec. 2, 2021

(51) Int. Cl.
*G01S 7/40* (2006.01)
*G01S 13/931* (2020.01)

(52) U.S. Cl.
CPC ........... *G01S 7/4039* (2021.05); *G01S 13/931* (2013.01)

(58) Field of Classification Search
CPC .............................. G01S 7/4039; G01S 13/931
See application file for complete search history.

(56) References Cited

U.S. PATENT DOCUMENTS

| | | | |
|---|---|---|---|
| 6,469,659 B1 | 10/2002 | Lajiness et al. | |
| 6,611,227 B1 | 8/2003 | Nebiyeloul-Kifle et al. | |
| 7,205,929 B2* | 4/2007 | Shingyoji | G01S 7/4004 342/72 |
| 9,291,659 B2* | 3/2016 | Ebling | G01R 29/10 |
| 2007/0013576 A1* | 1/2007 | Shingyoji | G01S 7/4004 342/146 |
| 2013/0015999 A1* | 1/2013 | Alland | G01S 13/931 342/70 |
| 2017/0059695 A1 | 3/2017 | Fetterman et al. | |
| 2019/0025404 A1 | 1/2019 | Farmer | |
| 2019/0334640 A1* | 10/2019 | Belfiore | H04B 1/40 |

* cited by examiner

*Primary Examiner* — Matthew M Barker
(74) *Attorney, Agent, or Firm* — Burns & Levinson LLP; Steven M. Mills

(57) ABSTRACT

According to a first aspect, a radar system with blockage detection is provided. The radar system includes a first antenna for receiving first signals and a second antenna for receiving second signals. Input circuitry processes the first signals to generate first input signals and processes the second signals to generate second input signals. A processor computes a correlation between the first input signals and the second input signals, determines a correlation variance related to variation in the correlation, and generates a determination as to whether the radar system is blocked using the correlation variance.

7 Claims, 37 Drawing Sheets

RADAR SYSTEM AND METHOD USING ANTENNA CORRELATION AND COVARIANCE EIGENVALUES IN RADAR SENSOR BLOCKAGE DETERMINATION

BACKGROUND

1. Technical Field

The present disclosure is related to automotive radar systems and, in particular, to an apparatus and method for detecting blockage of an automotive radar sensor.

2. Discussion of Related Art

In automotive radar systems, it is desirable to detect when the radar sensor is blocked by debris, such as dirt, snow, ice, etc. Sensor blockage or radar blockage attenuates the transmitted and received signal such that objects in the field of view are no longer detectable. It is also important to alert the driver when the sensor is blocked so that the driver does not rely on the radar system while a sensor is blocked, and so that the driver can intervene and clear the debris from the sensor to restore performance of the system.

Declaring a sensor blockage based on the absence of radar signal processing detections is a relatively straightforward means of determining sensor blockage with minimal additional processing time or resources. One drawback of this approach is that it is difficult to distinguish the blocked case from the case in which there are relatively few or no objects large enough to create detections in the field of view of a sensor that is not blocked and is functioning properly. This situation can occur, for example, when the automobile in which the system is operating is passing through a desert or along a bridge or causeway surrounded by water.

SUMMARY

According to a first aspect, a radar system with blockage detection is provided. The radar system includes a first antenna for receiving first signals and a second antenna for receiving second signals. Input circuitry processes the first signals to generate first input signals and processes the second signals to generate second input signals. A processor computes a correlation between the first input signals and the second input signals, determines a correlation variance related to variation in the correlation, and generates a determination as to whether the radar system is blocked using the correlation variance.

In some exemplary embodiments, the processor, in computing the correlation between the first input signals and the second input signals, computes a correlation coefficient. In some exemplary embodiments, the correlation coefficient is a Pearson correlation coefficient. In some exemplary embodiments, the correlation variance is related to variation in the correlation coefficient.

In some exemplary embodiments, if the correlation variance is below a threshold, then the determination is that the radar system is blocked.

In some exemplary embodiments, the radar system is an automotive radar system.

In some exemplary embodiments, the first antenna, second antenna, input circuitry and processor are housed within a housing of an automotive radar sensor module.

In some exemplary embodiments, the first antenna and second antenna comprise patch antenna arrays.

In some exemplary embodiments, the input circuitry comprises: a first mixer for generating first mixed signals; a second mixer for generating second mixed signals; a first analog-to-digital converter (ADC) for converting the first mixed signals to the first input signals; and a second ADC for converting the second mixed signals to the second input signals.

According to a second aspect, another radar system with blockage detection is provided. The radar system includes a first antenna for receiving first input signals and a second antenna for receiving second input signals. A processor generates a covariance matrix for the first input signals and the second input signals, computes eigenvalues for the covariance matrix, and generates a determination as to whether the radar system is blocked using the eigenvalues.

In some exemplary embodiments, each of the eigenvalues has a magnitude value; and a difference between the lowest of the magnitude values and the second lowest of the magnitude values is used in generating the determination as to whether the radar system is blocked.

In some exemplary embodiments, if the difference is below a threshold, the determination is that the radar system is blocked. In some exemplary embodiments, the threshold is less than or equal to 10%. In some exemplary embodiments, the threshold is 1%.

In some exemplary embodiments, the covariance matrix is a four-by-four matrix, and the processor computes four eigenvalues. In some exemplary embodiments, each of the eigenvalues has a magnitude value; and a difference between the lowest of the magnitude values and the second lowest of the magnitude values is used in generating the determination as to whether the radar system is blocked. In some exemplary embodiments, if the difference is below a threshold, the determination is that the radar system is blocked. In some exemplary embodiments, the threshold is less than or equal to 10%. In some exemplary embodiments, the threshold is 1%.

In some exemplary embodiments, the radar system is an automotive radar system.

In some exemplary embodiments, the first antenna, second antenna, input circuitry and processor are housed within a housing of an automotive radar sensor module.

In some exemplary embodiments, the first antenna and second antenna comprise patch antenna arrays.

In some exemplary embodiments, the input circuitry comprises: a first mixer for generating first mixed signals; a second mixer for generating second mixed signals; a first analog-to-digital converter (ADC) for converting the first mixed signals to the first input signals; and a second ADC for converting the second mixed signals to the second input signals.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Automotive radar is designed for active safety, and to provide a continuous level of safety, the radar must be able to detect if it is functioning according to specifications. If the radar is blocked by mud or snow or other obscurants, then the radar performance may be significantly degraded, and the user should be alerted. In some configurations, it would be desirable to include a secondary radar sensor dedicated to monitoring the physical state of the primary radar. However, due to considerations of cost and physical space, this approach is considered impractical. Therefore, according to the present disclosure, the radar system itself is configured to detect whether it is blocked and to report blockage to the user/operator. According to the present disclosure, an approach to detecting blockage, concluding whether the radar is blocked or unblocked, and reporting radar sensor blockage is described in detail.

Figure 1:
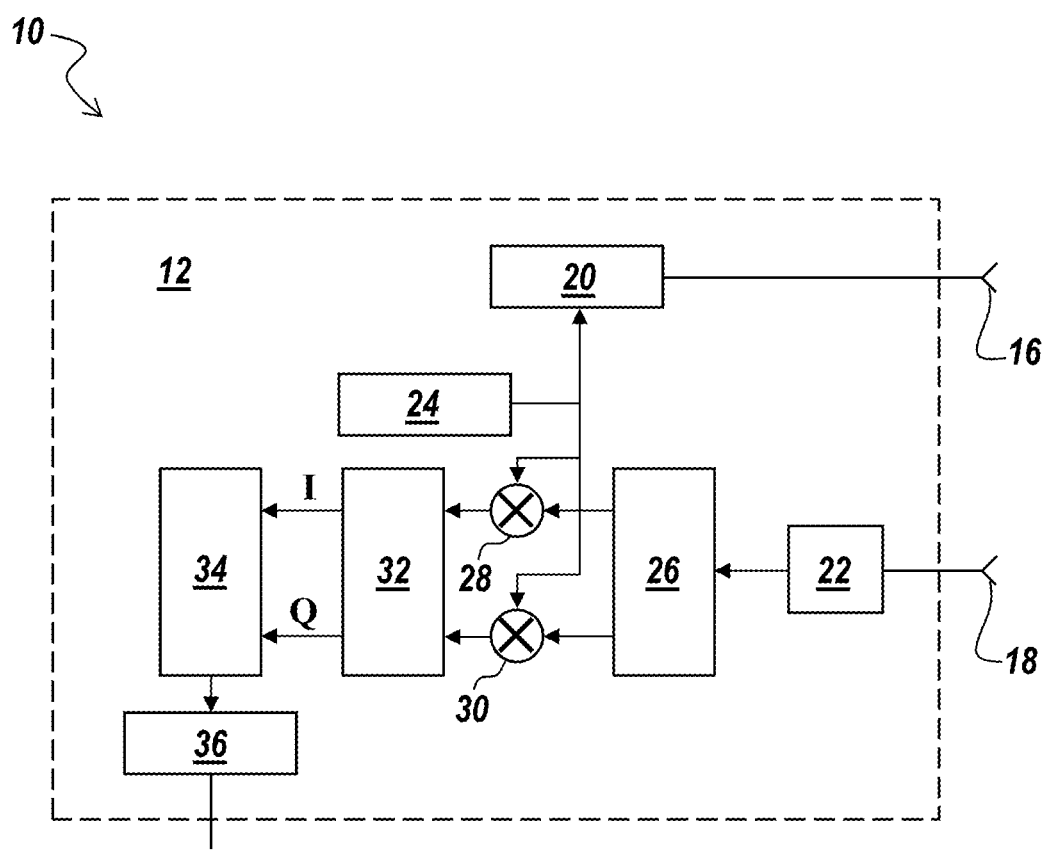
FIG. 1 includes a schematic block diagram of an automotive radar system 10 for processing automobile radar signals, in accordance with some exemplary embodiments.

FIG. 1 includes a schematic block diagram of an automotive radar system 10 for processing automobile radar signals, in accordance with some exemplary embodiments. Referring to FIG. 1, system 10 includes a radar sensor module 12, which processes radar transmit and receive signals which are compatible with the radar detection and monitoring system in the host automobile. Radar module 12 generates and transmits radar signals into the region adjacent to the host vehicle that is being monitored by the radar system. Generation and transmission of signals is accomplished by RF signal generator 24, radar transmit circuitry 20 and transmit antenna 16. In some exemplary embodiments, transmit antenna 16 can include multiple antenna arrays, for example, two transmit antenna arrays. Radar transmit circuitry 20 generally includes any circuitry required to generate the signals transmitted via transmit antenna 16, such as pulse shaping circuitry, transmit trigger circuitry, RF switch circuitry, or any other appropriate transmit circuitry used by the radar system.

Radar module 12 also receives returning radar signals at radar receive circuitry 22 via receive antenna 18. Receive antenna 18 can include multiple antenna arrays, for example, four receive antenna arrays. Radar receive circuitry 22 generally includes any circuitry required to process the signals received via receive antenna(s) 18, such as pulse shaping circuitry, receive trigger circuitry, RF switch circuitry, or any other appropriate receive circuitry used by the radar system. In some exemplary embodiments, the received signals processed by radar receive circuitry 22 are forwarded to phase shifter circuitry 26, which generates two signals having a predetermined phase difference. These two signals, referred to as an inphase (I) signal and a quadrature (Q) signal, are mixed with an RF signal from RF signal generator 24 by mixers 28 and 30, respectively. The resulting difference signals are further filtered as required by filtering circuitry 32 to generate baseband I and Q signals, labeled "I" and "Q" in FIG. 1. The baseband I and Q signals are digitized by analog-to-digital converter circuitry (ADC) 34.

In automobile radar systems, these digitized I and Q baseband signals are processed by a processor 36, which can include such circuitry as a digital signal processor (DSP), associated memory, associated I/O circuitry, communication bus circuitry, and any other circuitry required for carrying out any processing functions of system 10 and/or radar sensor 12. In some exemplary embodiments, the radar module 12 transmits and receives radar sweeps, i.e., frequency-modulated (FM) chirps, at a rate of approximately 12 Hz. In some exemplary embodiments, processor 36 can perform processing such as a fast Fourier Transform (FFT) to generate Doppler range-plus-velocity (RV) bins for each sweep, which include range, bearing and velocity information for radar detection of clutter. It will be understood that other sweep rates can be used. As used herein, the term "clutter" refers to any target or physical object that may return a radar signal resulting in a radar detection. These Doppler RV bins of radar clutter data are processed according to the detailed description herein to identify when the sensor is blocked.

According to the present disclosure, radar system 10 determines whether system 10 is detecting other automobiles and stationary objects in the region being monitored. If the radar is detecting clutter objects, e.g., other vehicles, poles, guardrails, road surface, etc., then the blockage state may be set to unblocked or clear. However, the converse is not necessarily true. That is, if the radar is not detecting clutter, it cannot necessarily be concluded that the radar is blocked. Instead, it is considered that the automobile could be in the desert scenario where there is little clutter. It should be noted that, according to the present disclosure, environments having little radar clutter may include a desert, or other regions such as a large parking lot with no features, a large snow-covered area, a bridge or causeway adjacent to a body of water, or a grassy landscape. According to the present disclosure, analysis of signals received at the receive antennas 18 is used to determine whether antennas 18 are blocked.

Blockage is a condition which can be characterized by reflected or absorbed power within the bumper fascia of the host automobile, which limits the power delivered to a target. The effects of this condition can be described by the attenuation coefficient B in the standard RADAR range equation:

$$R_{max} = \left[\frac{BP_t G\sigma A_e}{(4\pi)^2 S_{min}}\right]^{1/4}; \qquad (1)$$

where $R_{max}$ is the maximum range; B is the attenuation coefficient or blockage coefficient, $P_t$ is the transmit power, G is the antenna gain, $\sigma$ is the target cross-sectional area, $A_e$ is the effective aperture area, and $S_{min}$ is the minimum receivable signal power. In equation (1), the allowable values of B are between 0 and 1, since blockage never increases signal transmit power. A blockage detection subsystem according to the exemplary embodiments is directed to estimating the value of B by inference from RADAR system data products such as target range, return power level and measurable antennae characteristics.

In general, there are two main failure modes that RADAR will typically experience due to blockage. In the first mode, the RADAR transmit energy is completely absorbed by the blockage material so that no energy escapes from the bumper and no energy return is received. In the second mode, the RADAR transmit energy is completely reflected by the blockage material so that no energy escapes from the bumper but the receive energy will be approximately equal to the transmit energy.

In normal RADAR operation, some energy will be absorbed by the bumper, and some energy will be reflected by the bumper, but most energy will escape and return from the environment and be detected. The first blockage condition or mode can be simulated by pointing the RADAR detector at the sky, or off the edge of a cliff where no close targets are present. This scenario is referred to herein as the sky-facing or cliff scenario. The second blockage condition or mode can be simulated by covering the sensor with a blockage material, such as a wet cloth or other such material, to achieve a nominal blockage of 60 dB. When simulating these blockage conditions under testing, variance in correlation among the plural receive antennas 18 is minimal, indicating stationarity of the sensor in both cases. That is, the sky-facing or cliff sensor "sees" only thermal noise of the ADC, which correlates to zero. Similarly, the 60 dB blocked sensor "sees" only a static return from what would be within the automobile bumper in actual operation.

According to the present disclosure, it is recognized that signal return from the environment is a random process, which should exhibit high variance under normal operating conditions. An unblocked sensor will see extremely high variance in the return signal as the vehicle navigates an ever-changing environment. The blockage condition limits the return from the environment, causing the receive signal to become stationary, i.e., having minimal variance. Thus, according to the present disclosure, behavior of antennae correlation is used to as a quantifiable measurement of blockage. According to the present disclosure, blockage level can be measured from correlation variance.

According to exemplary embodiments, antennae correlation between two receive antennae Antenna1 and Antenna2, referred to as RX1 and RX2, respectively, is measured using the Pearson correlation coefficient ρ, according to equation (2):

$$\rho = \frac{\sum (X - \overline{X})(Y - \overline{Y})}{\sqrt{\sum (X - \overline{X})^2} \sqrt{\sum (Y - \overline{Y})^2}}; \qquad (2)$$

where
X: Antenna1 Input;
X: Mean of Antenna1 for a single pulse repetition interval (PRI);
Y: Antenna2 Input;
Y: Mean of Antenna2 for a single PRI.

It is noted that the numerator of equation (s) is the covariance between receive antennae RX1 and RX2, i.e., Cov(RX1,RX2); the first term in the denominator of equation (2) is the standard deviation of the Antenna1 data, i.e., Stddev(RX1); and the second term in the denominator of equation (2) is the standard deviation of the Antenna2 data, i.e., Stddev(RX2).

The Pearson correlation coefficient ρ has a value between −1 and +1. A value of 0 indicates no correlation between antennae. A value of +1 indicates a strong positive correlation. A value of −1 indicates a strong negative correlation.

Figure 2:
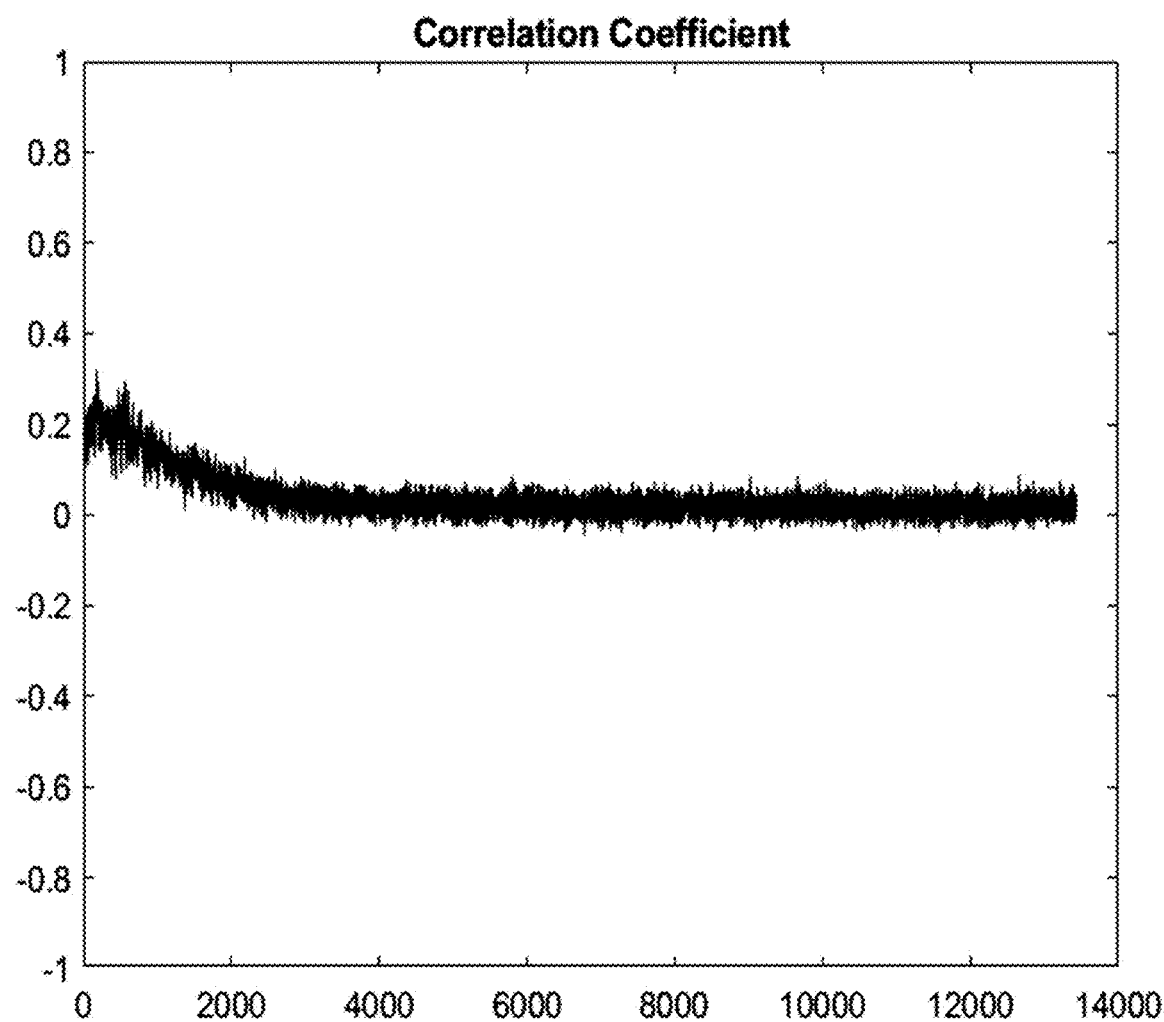
FIGS. 2 and 3 include plots of correlation coefficient over cycle or PRI, wherein each cycle is nominally 50 msec in duration, for two different operations scenarios, generated according to exemplary embodiments.
Figure 3:
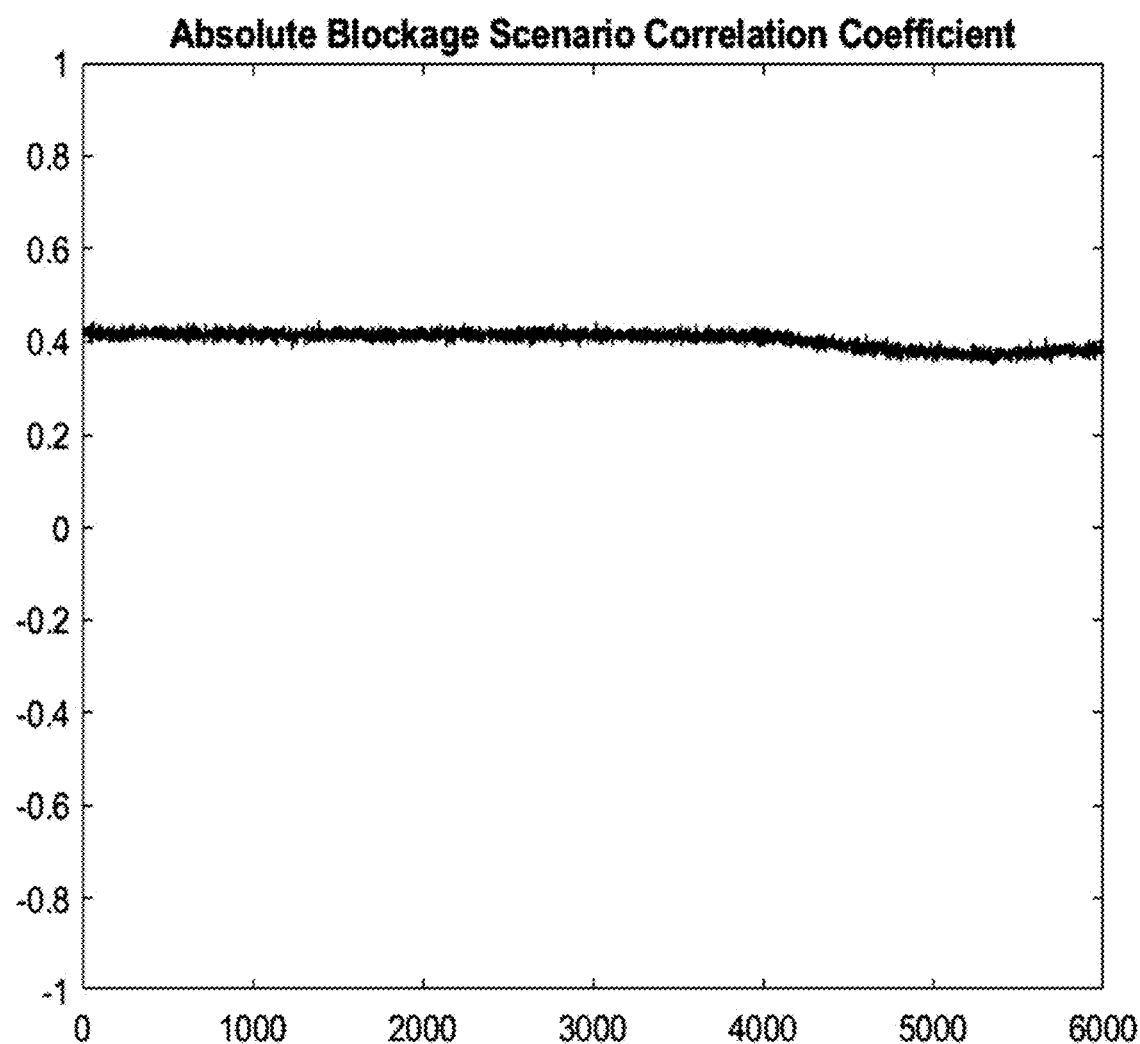

FIGS. 2 and 3 include plots of correlation coefficient over cycle or PRI, wherein each cycle is nominally 50 msec in duration, for two different operations scenarios, generated according to exemplary embodiments. Specifically, FIG. 2 illustrates the "sky-facing scenario" in which the sensor is directed to the sky, and FIG. 3 illustrates the absolute blockage scenario in which the 60 dB blockage is applied to the sensor. Referring to FIGS. 2 and 3, it is noted that, in both cases, the return signal from the environment is minimal to non-existent. Also, the level of the correlation coefficient is flat and regular.

Figure 4A:
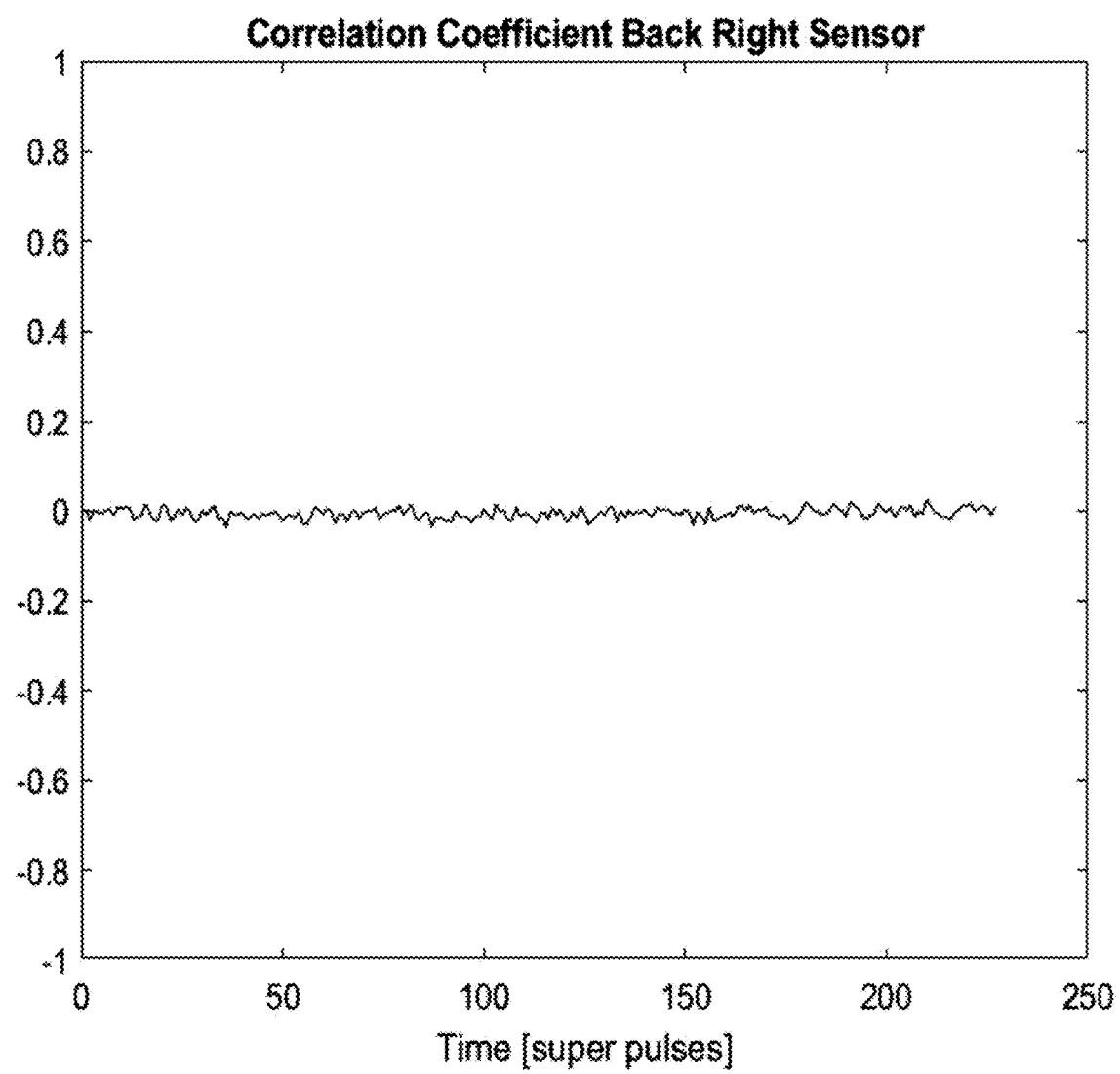
FIGS. 4A, 4B, 4C and 4D includes a plots of correlation coefficient over cycle, for an operational scenario in which the host vehicle is stopped and is resident in a sparse environment, i.e., an environment with few targets and a smooth road surface, such that very few or no detections are obtained.
Figure 4B:
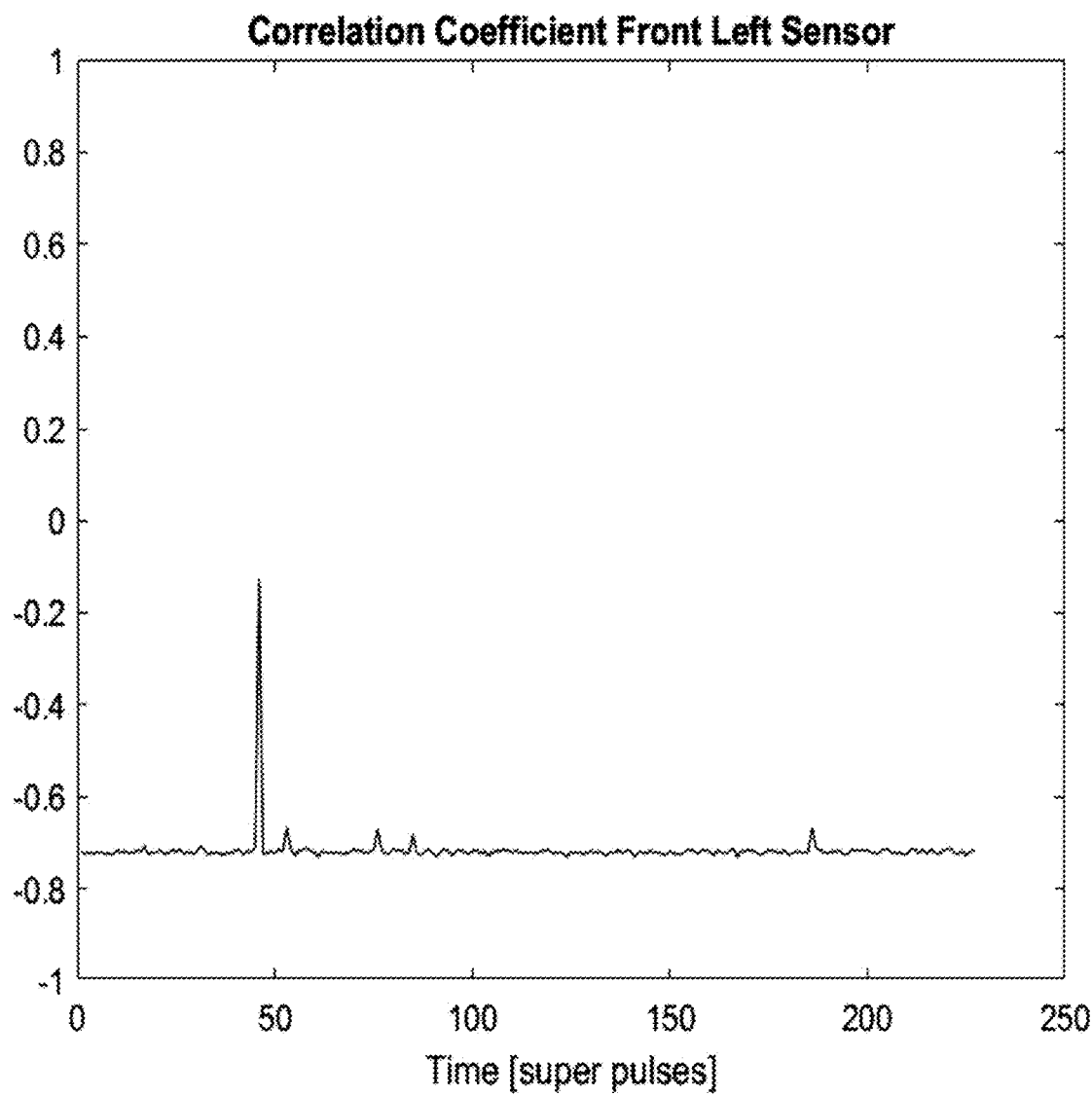
Figure 4C:
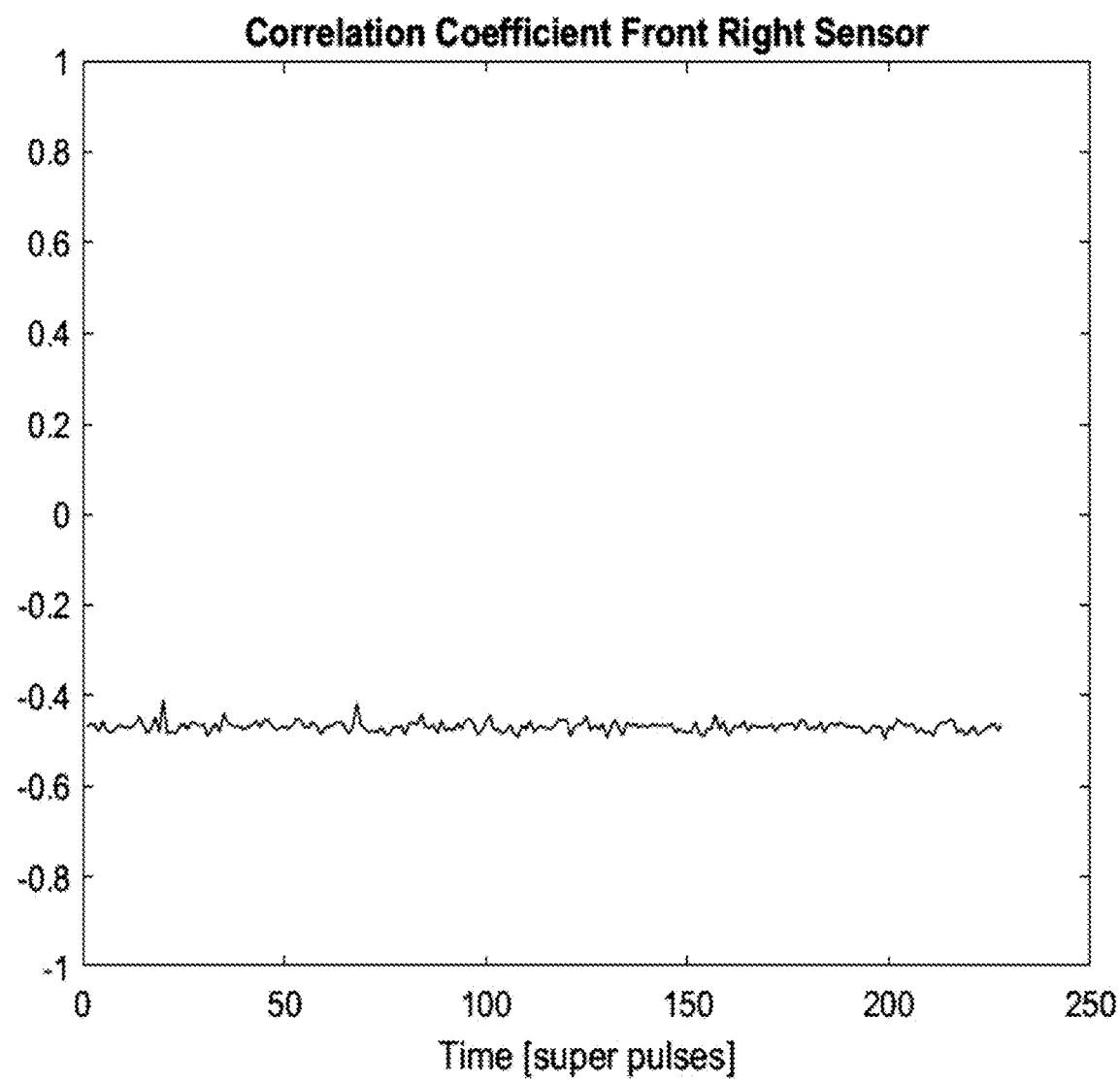
Figure 4D:
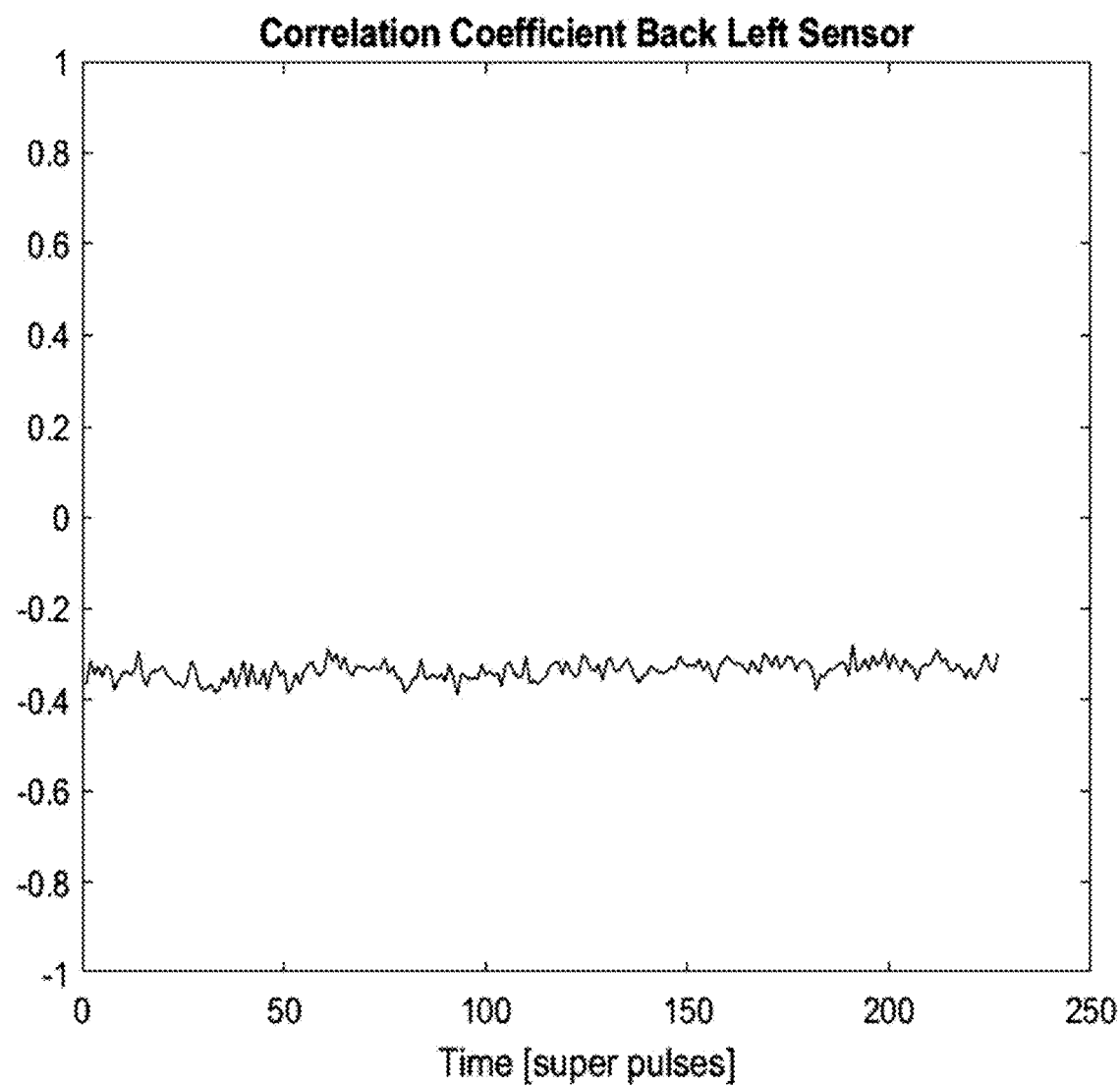
Figure 4E:
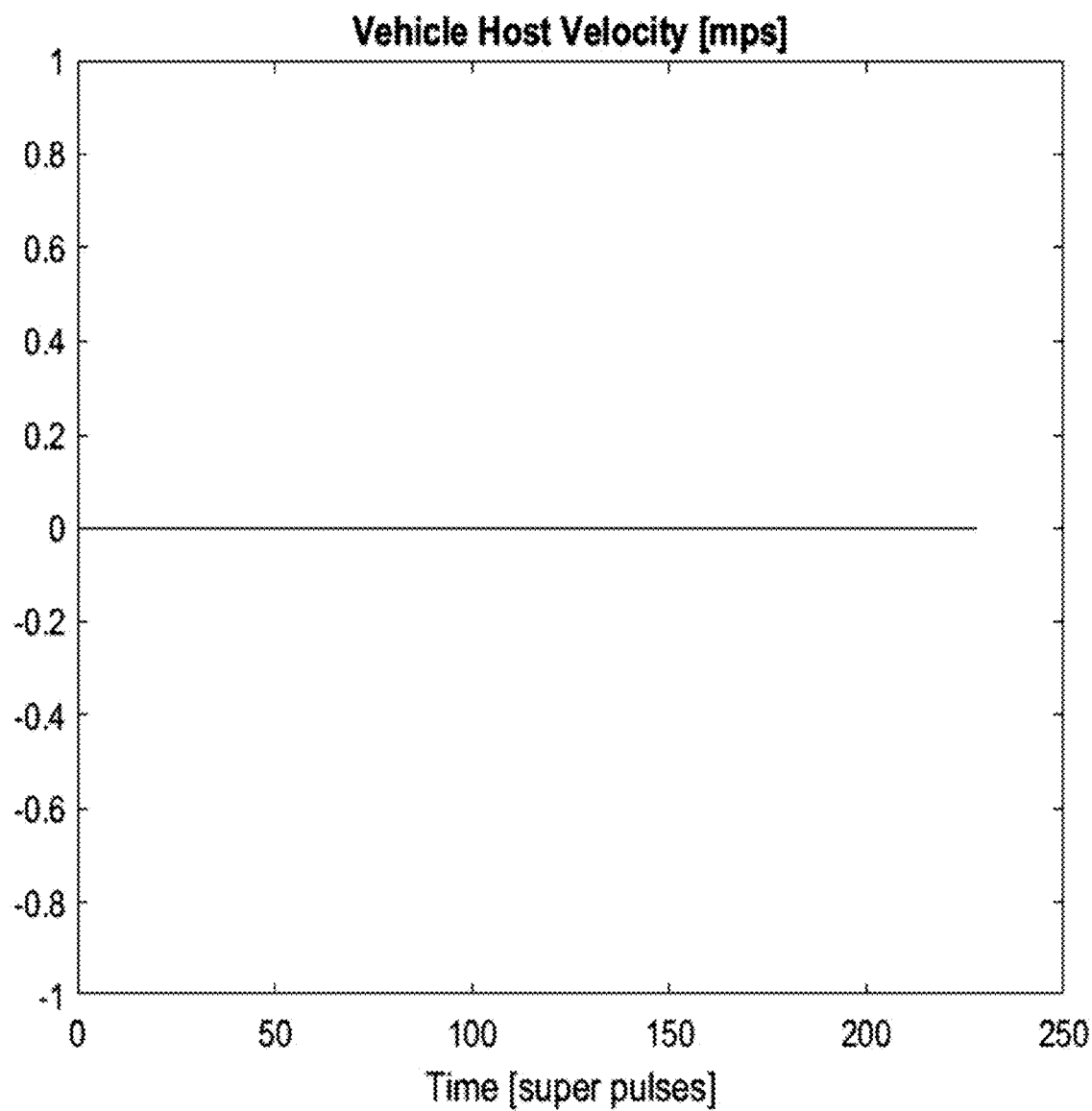
FIG. 4E is a plot of host vehicle speed in connection with the plots of FIGS. 4A through 4D.

FIGS. 4A, 4B, 4C and 4D includes a plots of correlation coefficient over cycle, for an operational scenario in which the host vehicle is stopped and is resident in a sparse environment, i.e., an environment with few targets and a smooth road surface, such that very few or no detections are obtained. The four plots of FIGS. 4A-4D are for four sensors at four different locations on the vehicle. Specifically, FIG. 4A is for a rear right sensor, FIG. 4B is for a front left sensor, FIG. 4C is for a front right sensor, and FIG. 4D is for a rear left sensor. FIG. 4E is a plot of host vehicle speed, indicating that the vehicle is stationary for the entire test period. As illustrated, the correlation coefficient behavior is similar to that in the blocked scenario.

Figure 5A:
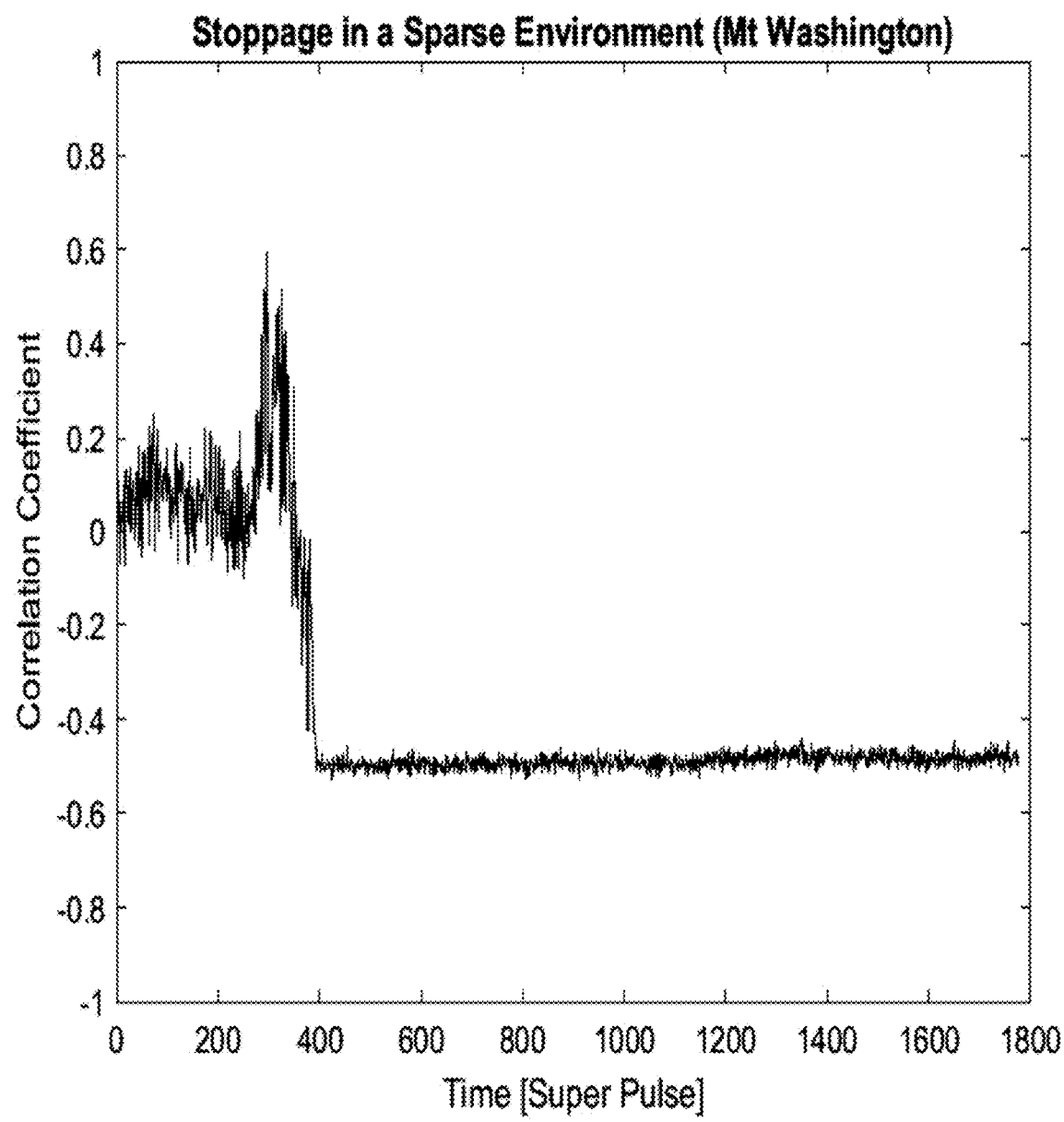
FIG. 5A includes a plot of correlation coefficient over cycle, for an operational scenario in which the host vehicle is initially moving and then is brought to a stop and is resident in a sparse environment.
Figure 5B:
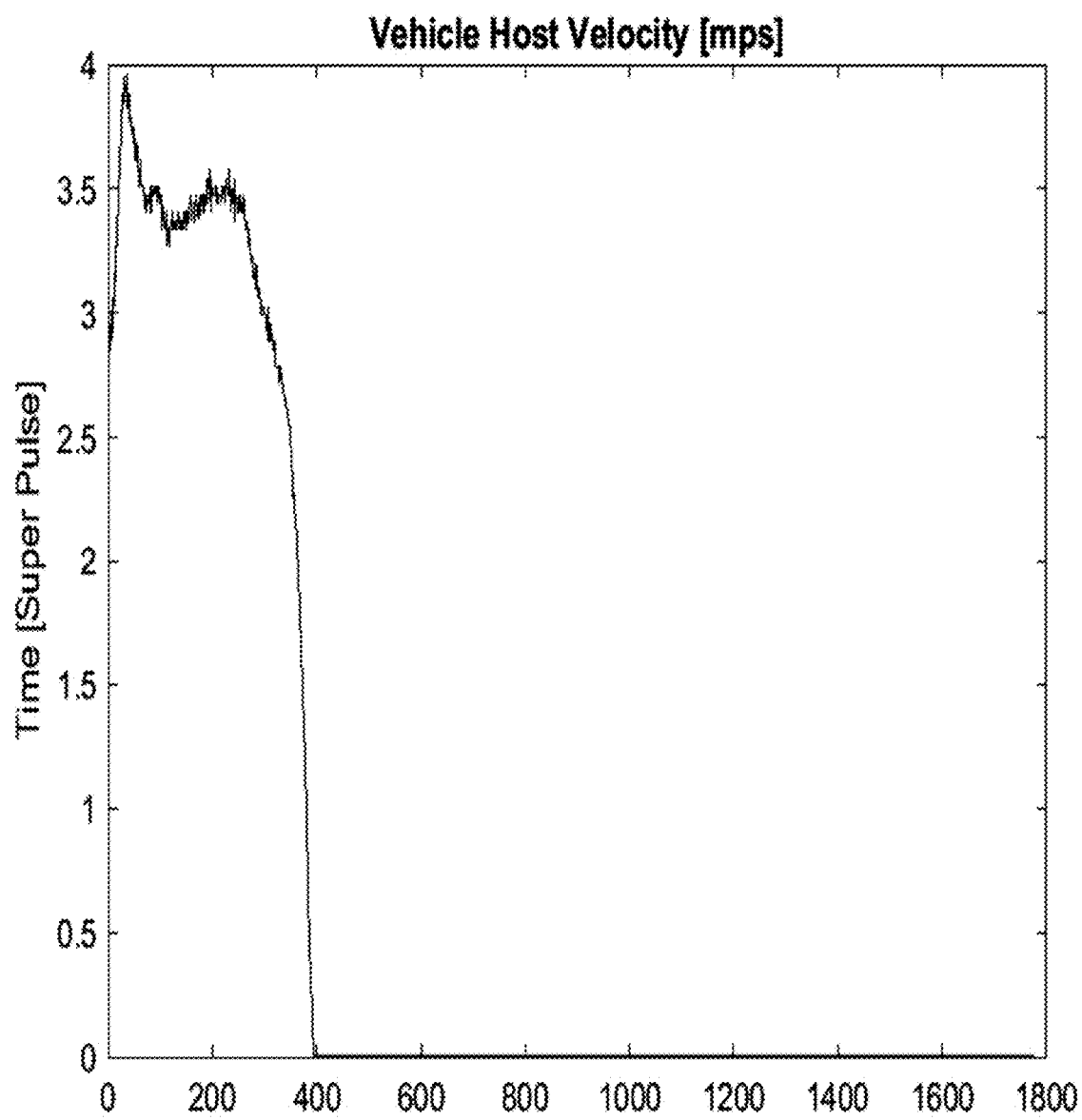
FIG. 5B is a plot of host vehicle speed.

FIG. 5A includes a plot of correlation coefficient over cycle, for an operational scenario in which the host vehicle is initially moving and then is brought to a stop and is resident in a sparse environment. FIG. 5B is a plot of host vehicle speed. As illustrated, the data is sparse, so the variance is low. A clear transition in correlation coefficient from the moving scenario to the stopped scenario is illustrated.

Figure 6A:
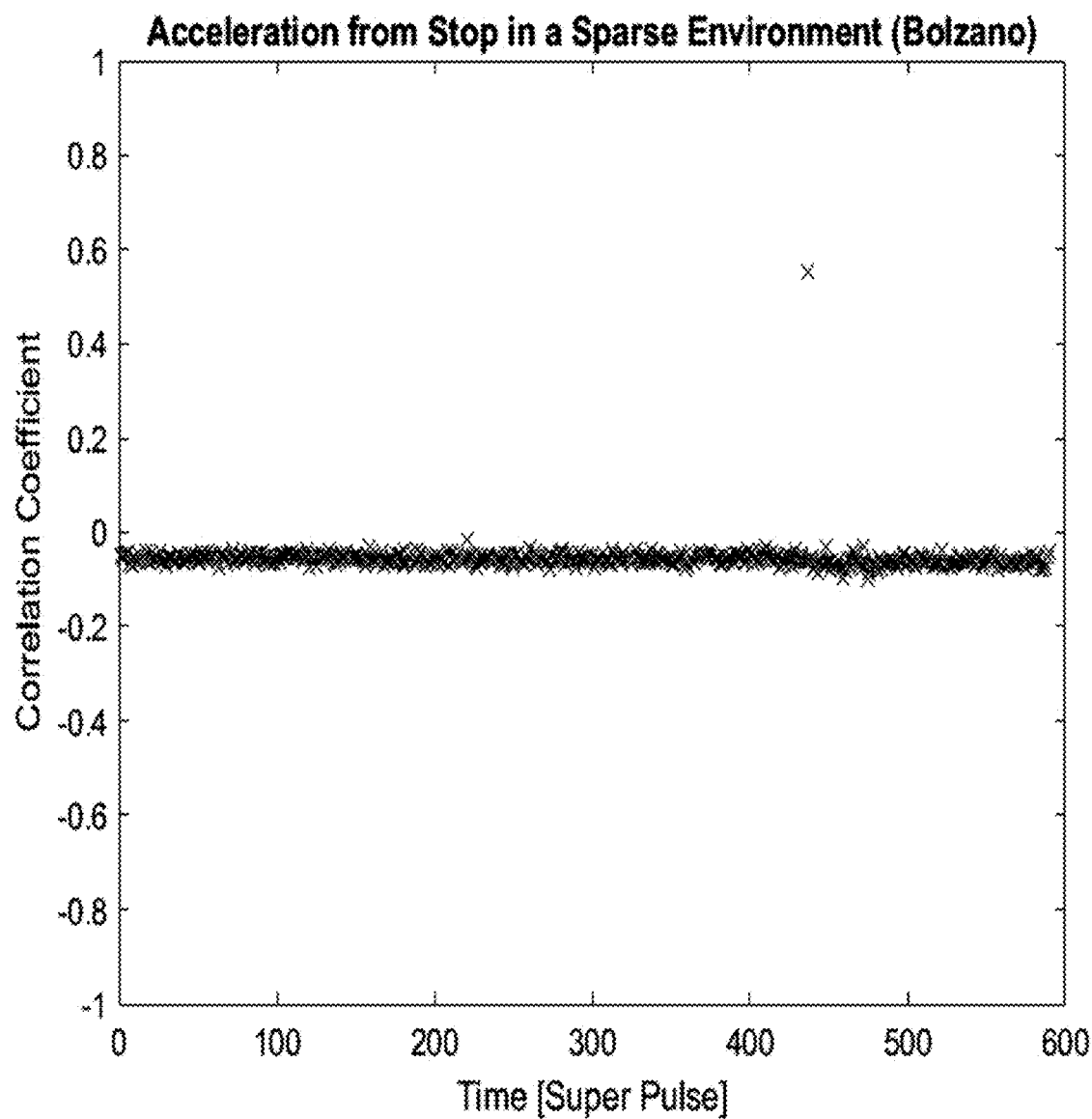
FIG. 6A includes a plot of correlation coefficient over cycle, for an operational scenario in which the host vehicle is initially stationary and then begins moving and is resident in a sparse environment.
Figure 6B:
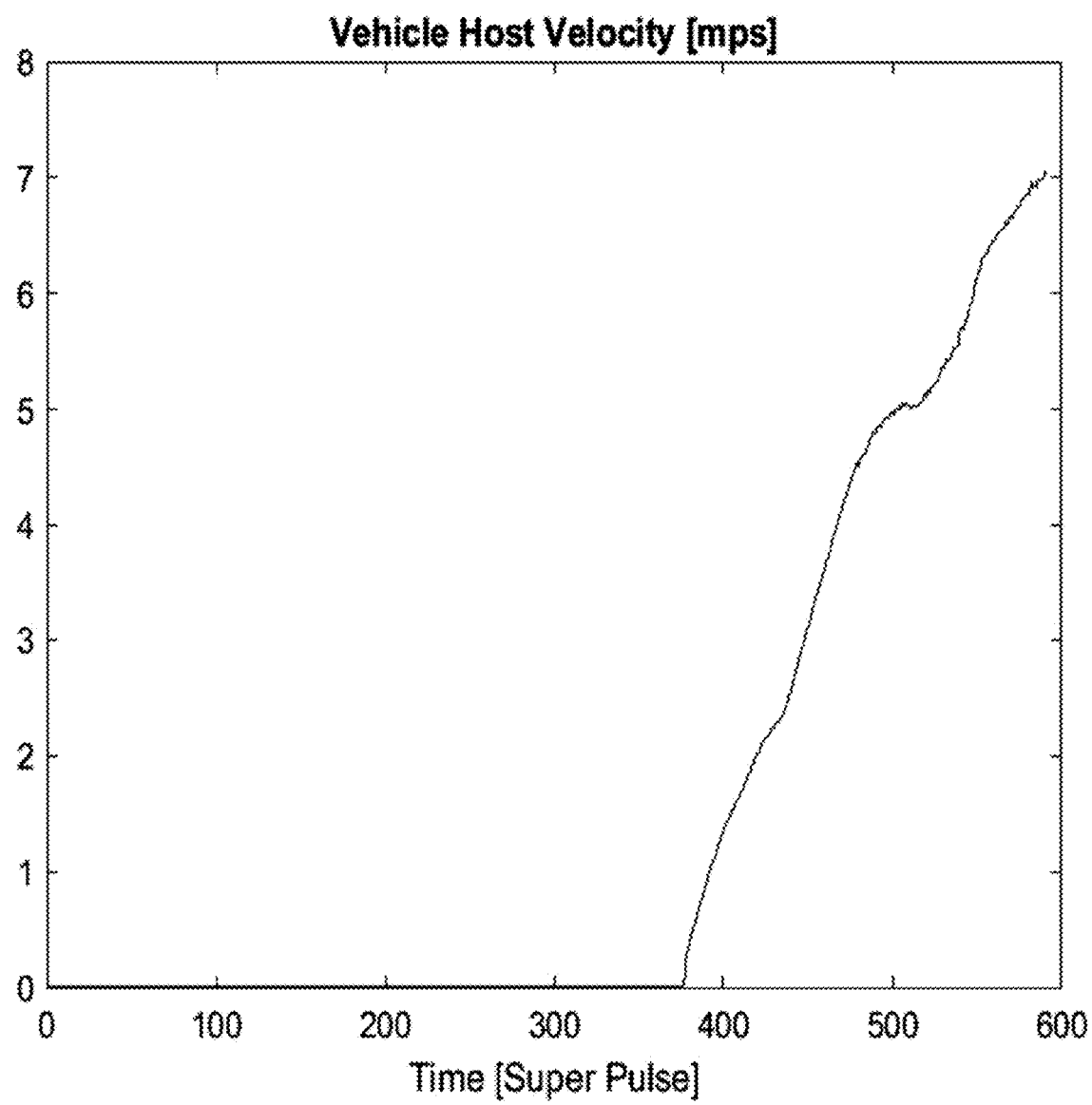
FIG. 6B is a plot of host vehicle speed.

FIG. 6A includes a plot of correlation coefficient over cycle, for an operational scenario in which the host vehicle is initially stationary and then begins moving and is resident in a sparse environment. FIG. 6B is a plot of host vehicle speed. As illustrated, the data is sparse, so the variance is low. A clear transition in correlation coefficient from the stopped scenario to the moving scenario is illustrated. Thus, in the scenarios of FIGS. 5A, 5B, 6A, 6B, the effects of vehicle motion on correlation coefficient can be detected to determine that the RADAR sensor is not blocked.

Figure 7A:
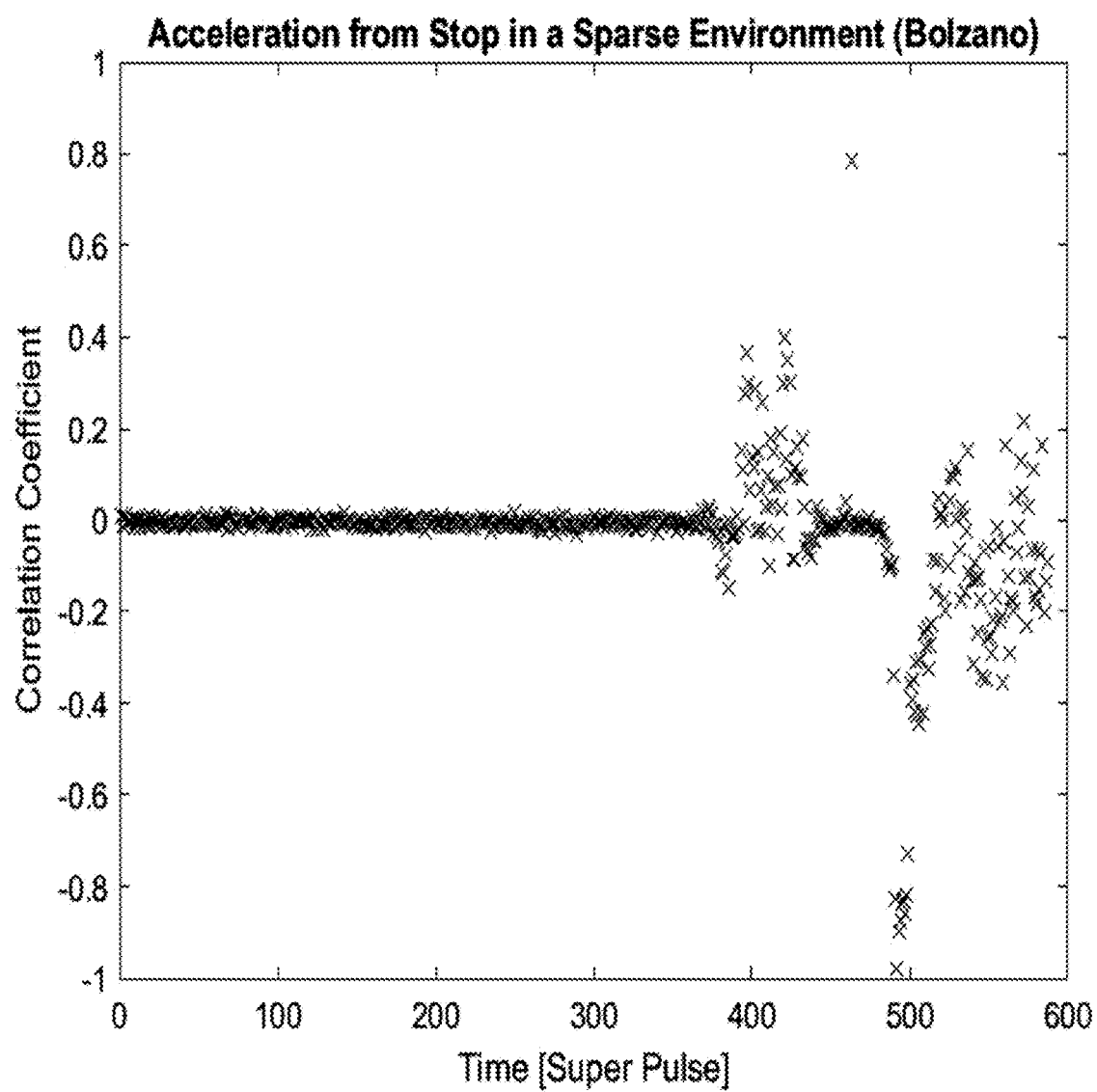
FIG. 7A includes a plot of correlation coefficient over cycle, for an operational scenario in which the host vehicle is initially stationary and then begins moving and is resident in a sparse environment.
Figure 7B:
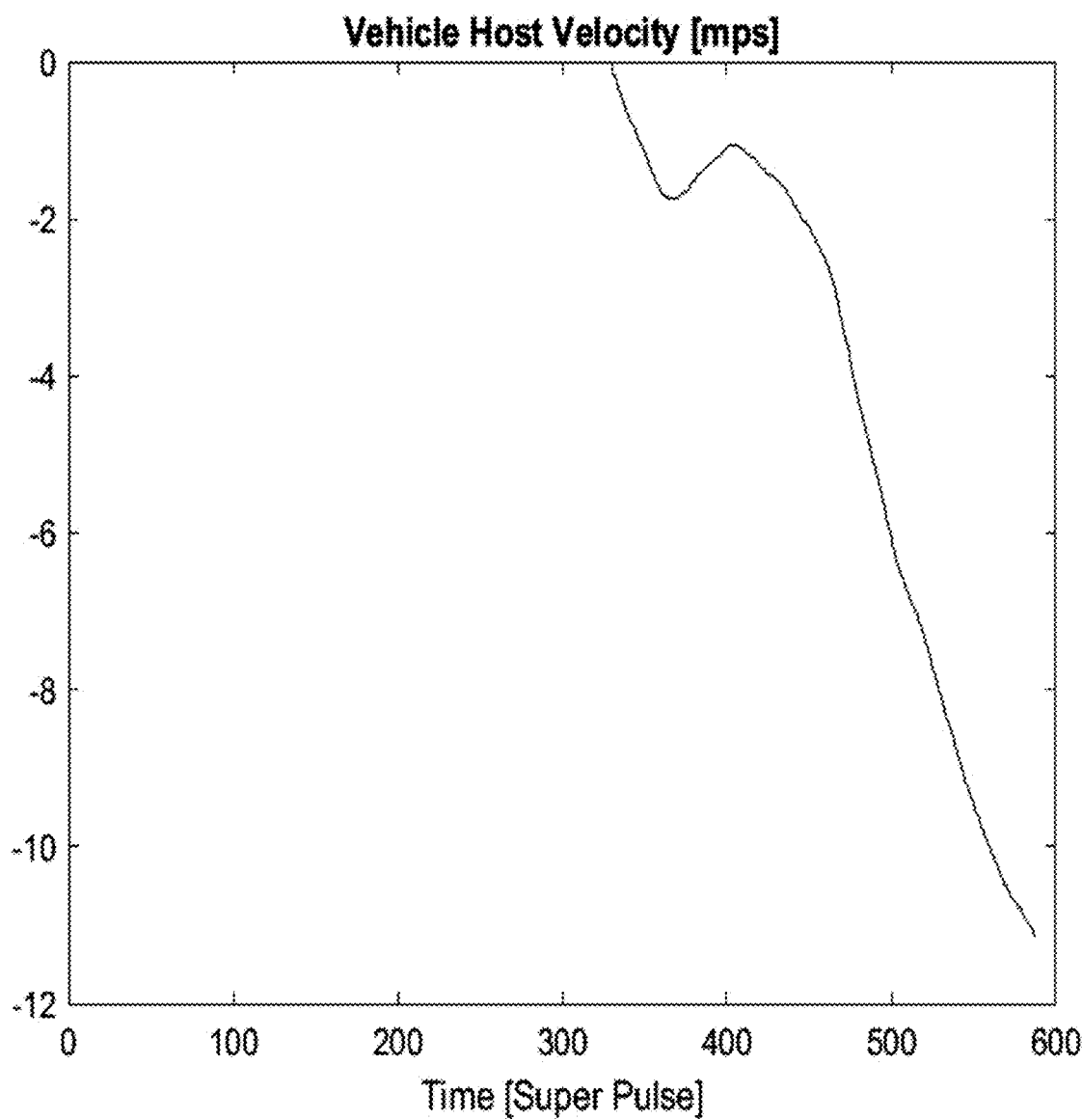
FIG. 7B is a plot of host vehicle speed.

FIG. 7A includes a plot of correlation coefficient over cycle, for an operational scenario in which the host vehicle is initially stationary and then begins moving and is resident in a sparse environment. FIG. 7B is a plot of host vehicle speed. As illustrated, the data is sparse, so the variance is low. The scenario of FIGS. 7A, 7B is different from that of FIGS. 6A, 6B in that the host vehicle is moving in the opposite direction or the sensor used in FIG. 7A, 7B is facing a direction opposite from that of FIGS. 6A, 6B. Once again, a clear transition in correlation coefficient from the stopped scenario to the moving scenario is illustrated. Thus, in the scenarios of FIGS. 5A, 5B, 6A, 6B, 7A, 7B, the effects of vehicle motion on correlation coefficient can be detected to determine that the RADAR sensor is not blocked.

Figure 8A:
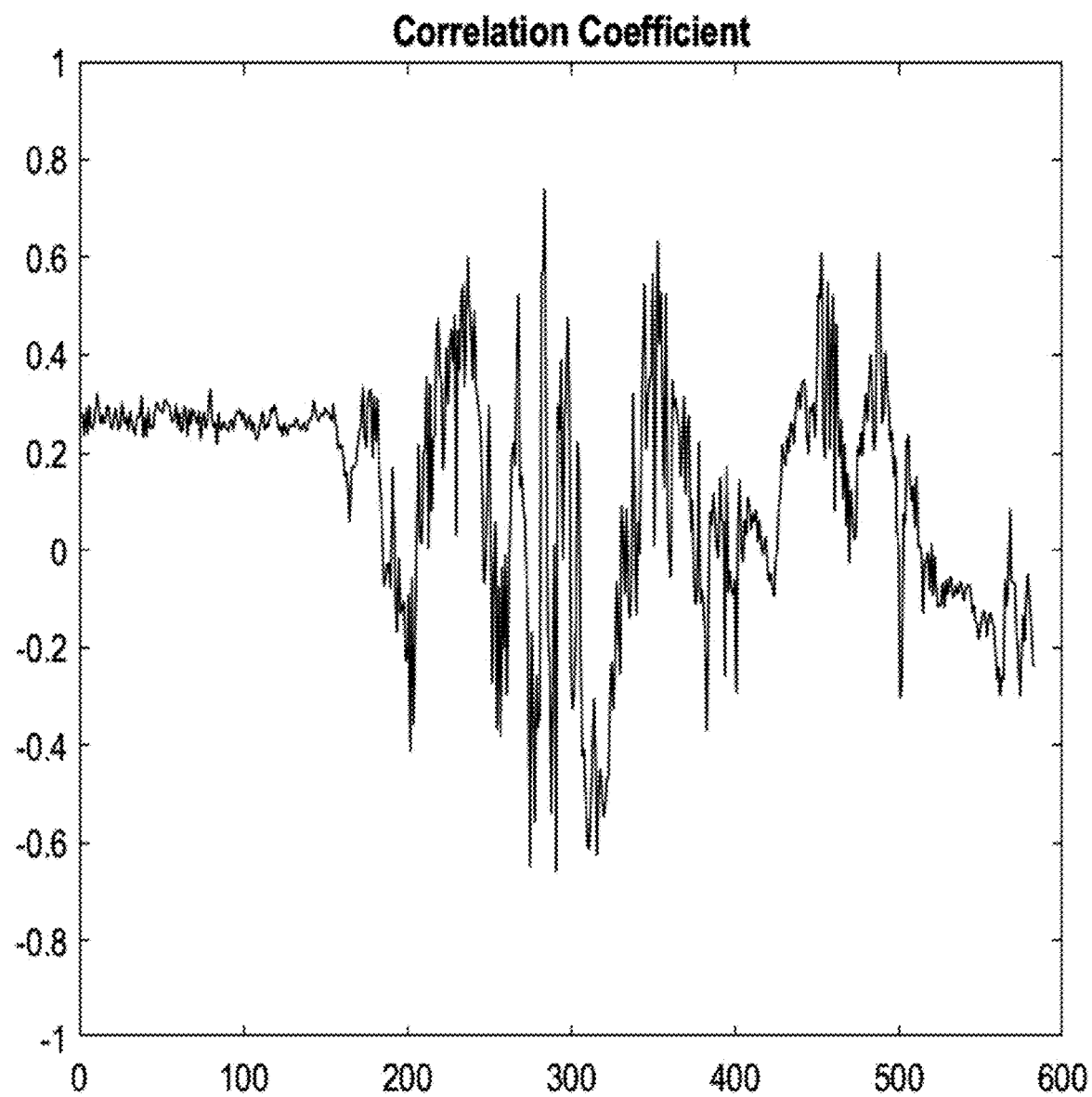
FIGS. 8A and 8B include plots of correlation coefficient over cycle, for an exemplary operational scenario in which the host vehicle is moving in a sparse environment.
Figure 8B:
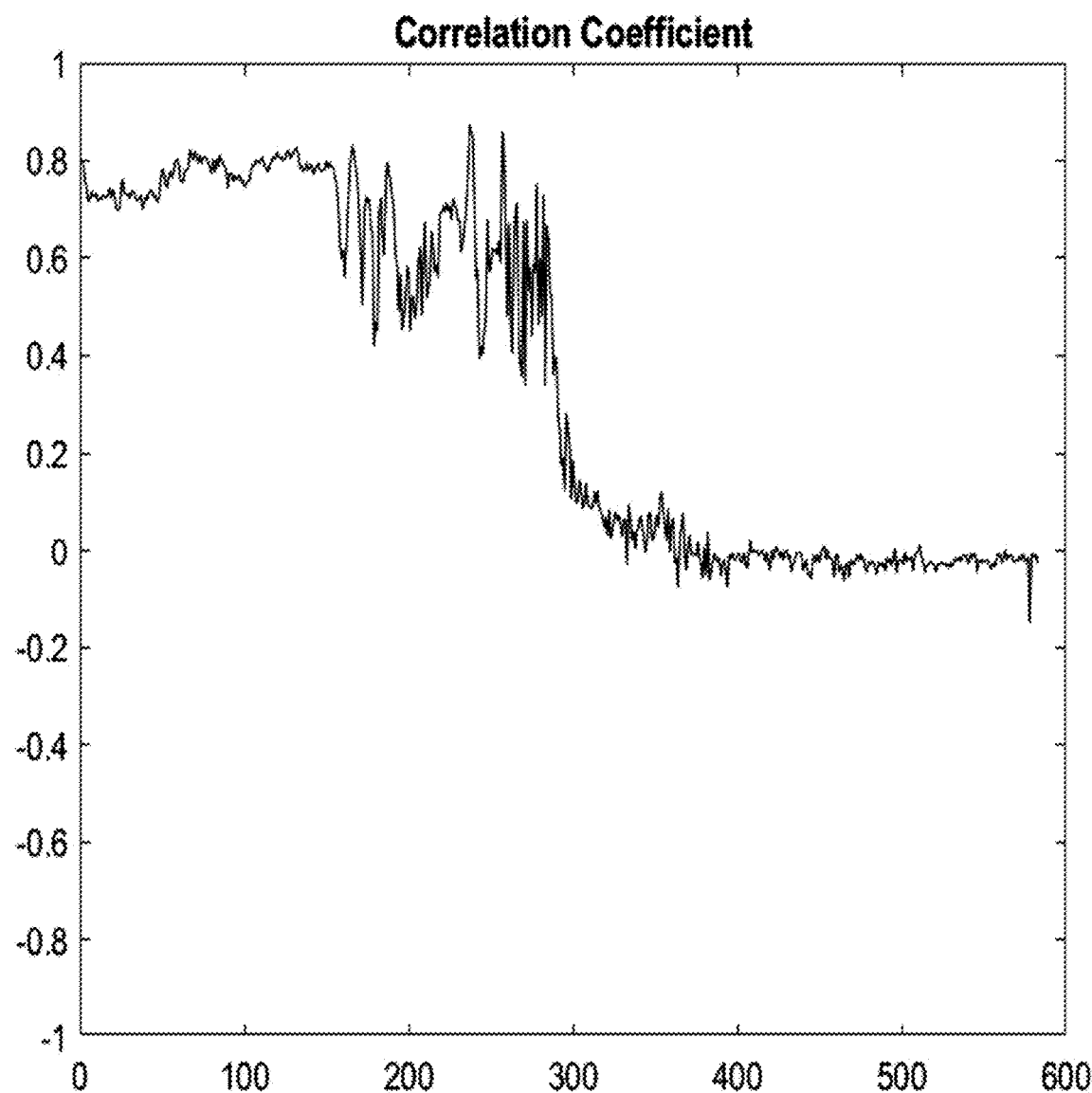

FIGS. 8A and 8B include plots of correlation coefficient over cycle, for an exemplary operational scenario in which the host vehicle is moving in a sparse environment. FIGS. 8A and 8B illustrate correlation coefficients for the same recording for two different sensor positions on the moving vehicle. For example, FIG. 8A is for a rear left sensor, and FIG. 8B is for a rear right sensor. As illustrated in FIGS. 8A and 8B, even in a sparse environment, the change in correlation coefficient can be used to conclude that the sensor is not blocked Thus, according to the present disclosure, detectable variations in correlation coefficient are present in all environments, both sparse and dense. True sensor blockage can be detected by the absence of energy variation, since RADAR returns become highly stationary in the presence of a blockage condition. A premise of the present disclosure is that changes in the signal return indicate an absence of blockage. By measuring signal variation, i.e., variation in correlation coefficient, it can be determined whether the sensor is clear or blocked in the presence of relative motion.

According to another exemplary embodiment of the present disclosure, instead of direct analysis of the correlation coefficient between antennas of the sensor to identify changes in correlation coefficient to conclude non-blockage, as described above, the covariance matrix for the antennas can be analyzed to make a determination as to blockage. Specifically, according to exemplary embodiments, analysis of the eigenvalues of the antennae covariance matrix is used to make a determination as to blockage.

Eigenvalues are roots of the characteristic equation used to describe the structure of a data set. Eigenvalues are used in principal component analysis to reduce the complexity of data to aid in its analysis. They indicate the spread of the data in the dataset in multiple dimensions and can indicate the dimensionality of the dataset. For example, a four-dimensional dataset, such as the dataset obtained according to the present disclosure for an exemplary RADAR sensor having four antennas, will have four eigenvalues.

According to the present disclosure, the input signal at each antenna can be described as:

$$x_i = \begin{cases} z_i, & \text{no signal present} \\ s_i + z_i, & \text{signal present} \end{cases} \quad (3)$$

where $x_i$, is the total signal, $z_i$ is noise and $s_i$ is signal. Therefore, the signal x can be expressed as a sum of signal s and noise z. The signal and noise elements are independent, so the covariance matrix of the input can be written as:

$R = R_s + \sigma^2 I$ (4); where R is the covariance matrix, $R_S$ is the signal covariance matrix, $\sigma^2$ is the variance of the noise, and I is an identity matrix. The smallest eigenvalues of the measured input will be those of the environment noise and will be equal to $\sigma^2$. According to the exemplary embodiments, the presence of a received signal is observed by observation of the calculated eigenvalues. In the approach of the disclosure, the presence of a signal does not necessarily indicate the absence of blockage.

QR decomposition is a known technique for computing covariance matrices that are used in adaptive beamforming and channel whitening systems. The QR operation factors an input matrix into the components Q, an orthonormal rotation matrix, and R, an upper triangular covariance matrix. The output products Q and R can be used to calculate the eigenvalues of the received signal.

Under certain conditions, a covariance matrix is a correlation matrix. The input is zero mean with unit standard deviation. We do not operate in those conditions. The correlation coefficient is defined by equation (s) above. The correlation denominator has two separate components:

$\sqrt{\Sigma(X-\overline{X})^2}$, which is the standard deviation of X, and $\sqrt{\Sigma(Y-\overline{Y})^2}$, which is the standard deviation of Y.

It is noted that, typically, standard deviation has a 1/N^2 term, but for purposes of this disclosure, it can be ignored. If the standard deviation of X and Y is equal to 1, then equation (2) reduces to:

$\Sigma(X-\overline{X})(Y-\overline{Y})$.

According to the present disclosure, this expression is the covariance of X and Y. The off-diagonal elements of covariance matrix R are, however, translatable to the correlation values described above:

$$R = \begin{bmatrix} \text{Cov}(RX0, RX0) & \text{Cov}(RX0, RX1) & \text{Cov}(RX0, RX2) & \text{Cov}(RX0, RX2) \\ 0 & \text{Cov}(RX1, RX1) & \text{Cov}(RX1, RX2) & \text{Cov}(RX1, RX2) \\ 0 & 0 & \text{Cov}(RX2, RX2) & \text{Cov}(RX2, RX2) \\ 0 & 0 & 0 & \text{Cov}(RX3, RX3) \end{bmatrix}$$

Eigenvalues exist for square matrices, so, according to the exemplary embodiments, a square covariance matrix R is generated from RADAR transmit ramp data. Following is pseudocode summary from MATLAB® numerical computing environment and proprietary programming language developed by MathWorks® of Natick, Mass., USA. The code illustrates realization of the QR algorithm. The purpose of the QR algorithm is to compute the eigenvalues of Y, which is the covariance matrix of the antenna data. A single call to the QR decomposition function produces the upper triangular matrix R and an orthonormal rotation matrix Q. These values are used to obtain the eigenvalues of Y. In some particular exemplary embodiments, a single iteration is not adequate to compute the eigenvalues, since they will contain a high error level. Multiple iterations cause the computed values to converge. In some particular exemplary embodiments, the eigenvalues are taken from the diagonal of Y after 20 iterations. Other numbers of iterations can be used.

```
X = [Ant0_Ramp0, Ant1_Ramp0, Ant2_Ramp0, Ant3_Ramp0];
% X is 4x2048
    Y = X*X';         % Y = X*X^H is 4x4. X is purely real so simple
transpose is acceptable.
    for niter = 1:20,
        [Q,R] = qr(Y);
        Y = R*Q;
    end
        E = diag(Y);    % Eigenvalues of X are stored on diagonal
of Y matrix
```

According to principal component analysis, the proportion of total sample population variance due to the kth principal component is equal to $$\frac{\lambda_k}{\lambda_1 + \lambda_2 + \ldots + \lambda_k}; \quad (5)$$

where $\lambda_i$ is the $i^{th}$ eigenvalue. It is noted that larger eigenvalues are dominant. Thus, the spread between largest and smallest eigenvalues can be used to infer signal quality, according to the exemplary embodiments described herein.

Thus, according to the disclosure, blockage can be identified as a stationary process. The sample mean does not move in time, and variance around the mean is minimal. This is observed in both the correlation coefficient and the covariance matrix eigenvalues. Blockage can also be characterized by decreased signal complexity. Two primary eigenvalues can be identified in both the blocked and unblocked cases. In the unblocked case, however, a third eigenvalue may be present exhibiting separation from the noise floor. That is, in the blocked case, the first and second eigenvalues are dominant, and the third and fourth eigenvalues are close together in relatively low value, i.e., are close to the noise floor. In contrast, in the unblocked case, the first and second eigenvalues are dominant, but the third and fourth eigenvalues are not close together, and the third eigenvalue may be significantly above the noise floor.

Following is pseudocode describing the blockage classification approach of the disclosure, using correlation and/or eigenvalues, as described above, according to some exemplary embodiments.

```
If detections
    Not fully blocked
Else
    If moving
        If correlation/eigenvalues are stationary
            If correlation is stationary at 0
                Not fully blocked
            Else
                Blockage
        Else
            Not fully blocked
    Else
        If correlation/eigenvalues are stationary
            If correlation is stationary at 0
                Not fully blocked
            Else
                If 3rd and 4th eigenvalues are close to each other
                    Blockage
                Else
                    Not fully blocked
        Else
            Not fully blocked
```

Figure 9A:
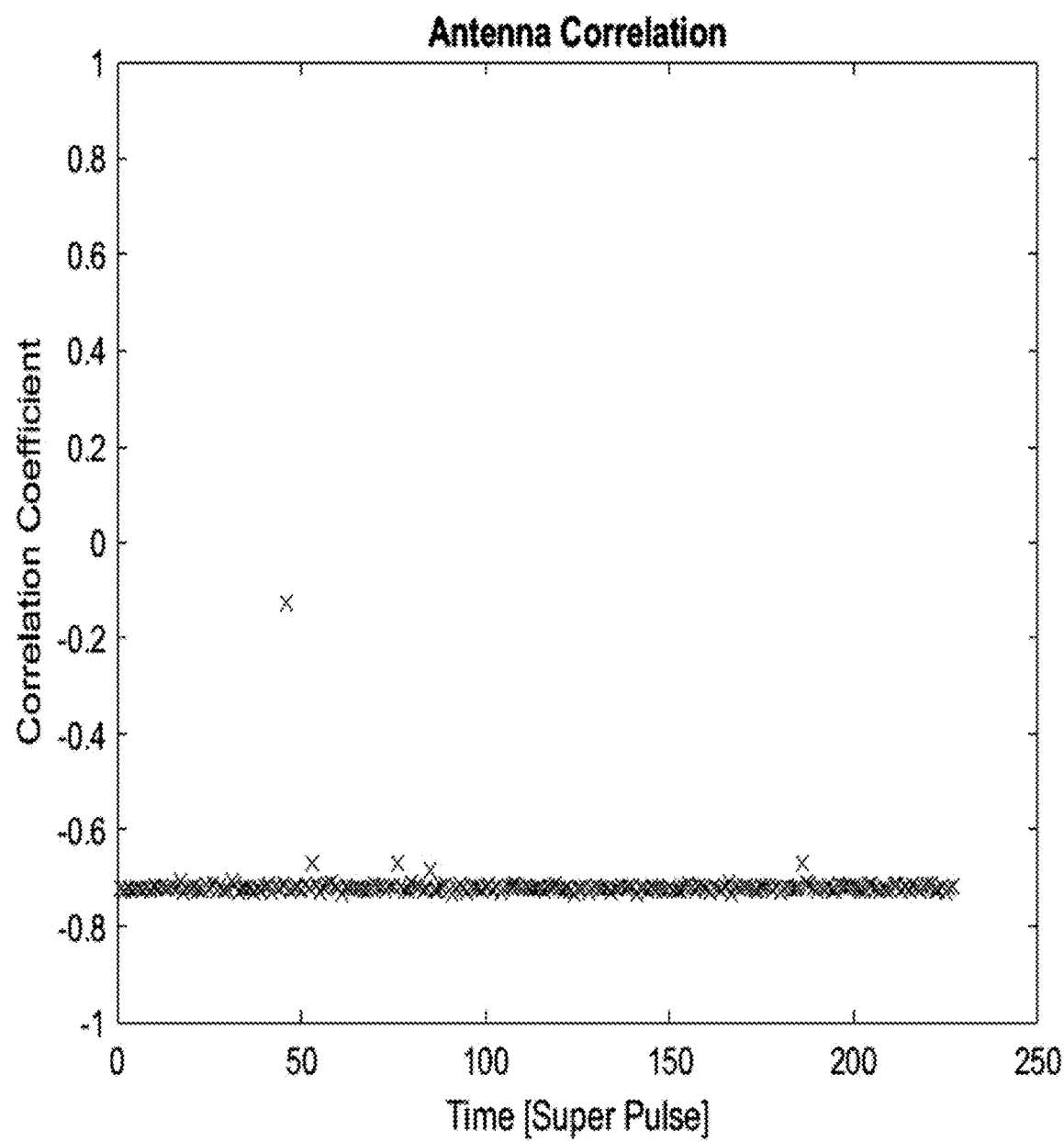
FIGS. 9A-9H include plots of correlation coefficient and four eigenvalues and their percentage of variance over time, i.e., over cycle or pulses, wherein each cycle is nominally 50 msec in duration, in a particular operational scenario, generated according to exemplary embodiments.
Figure 9B:
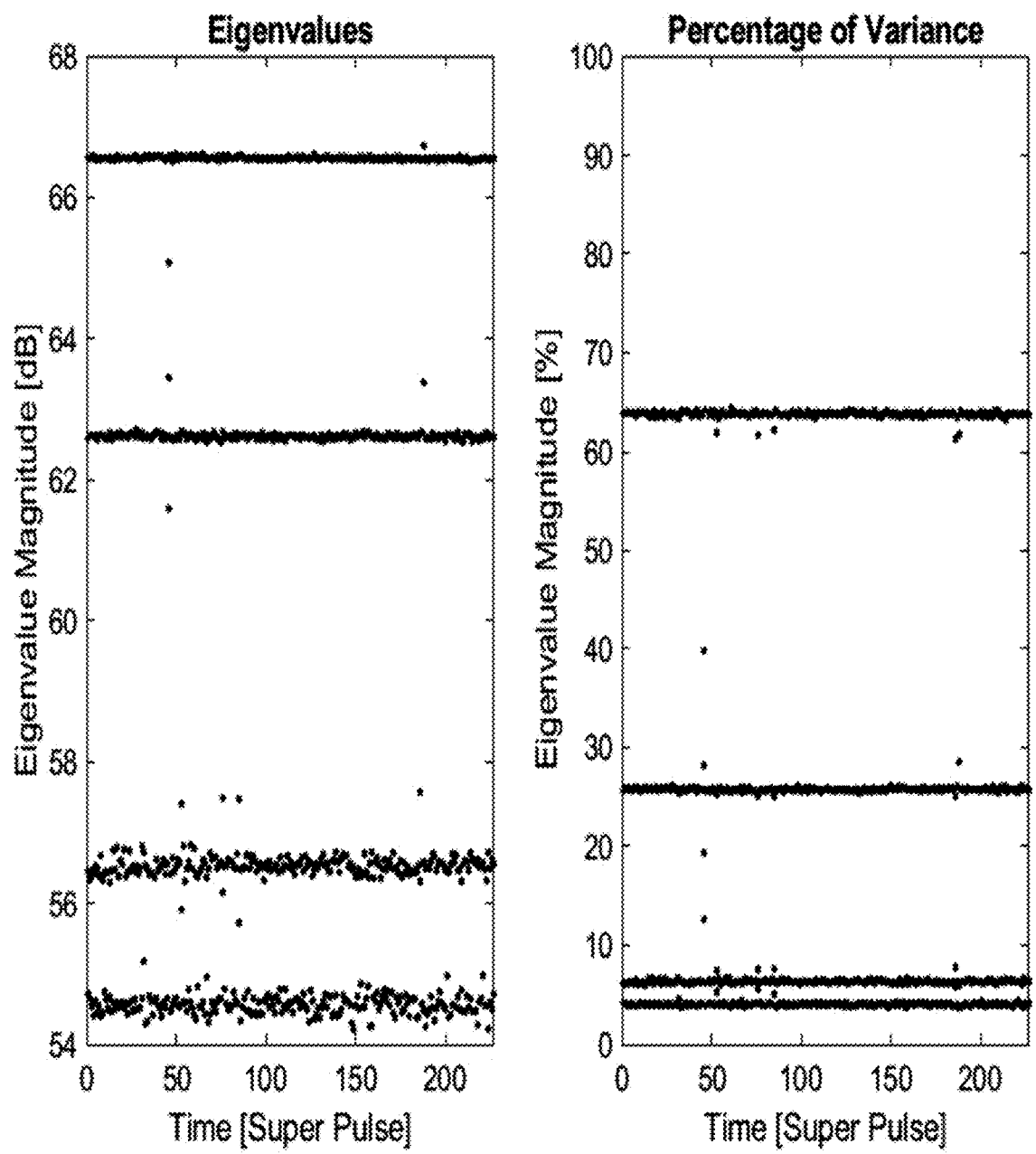
Figure 9C:
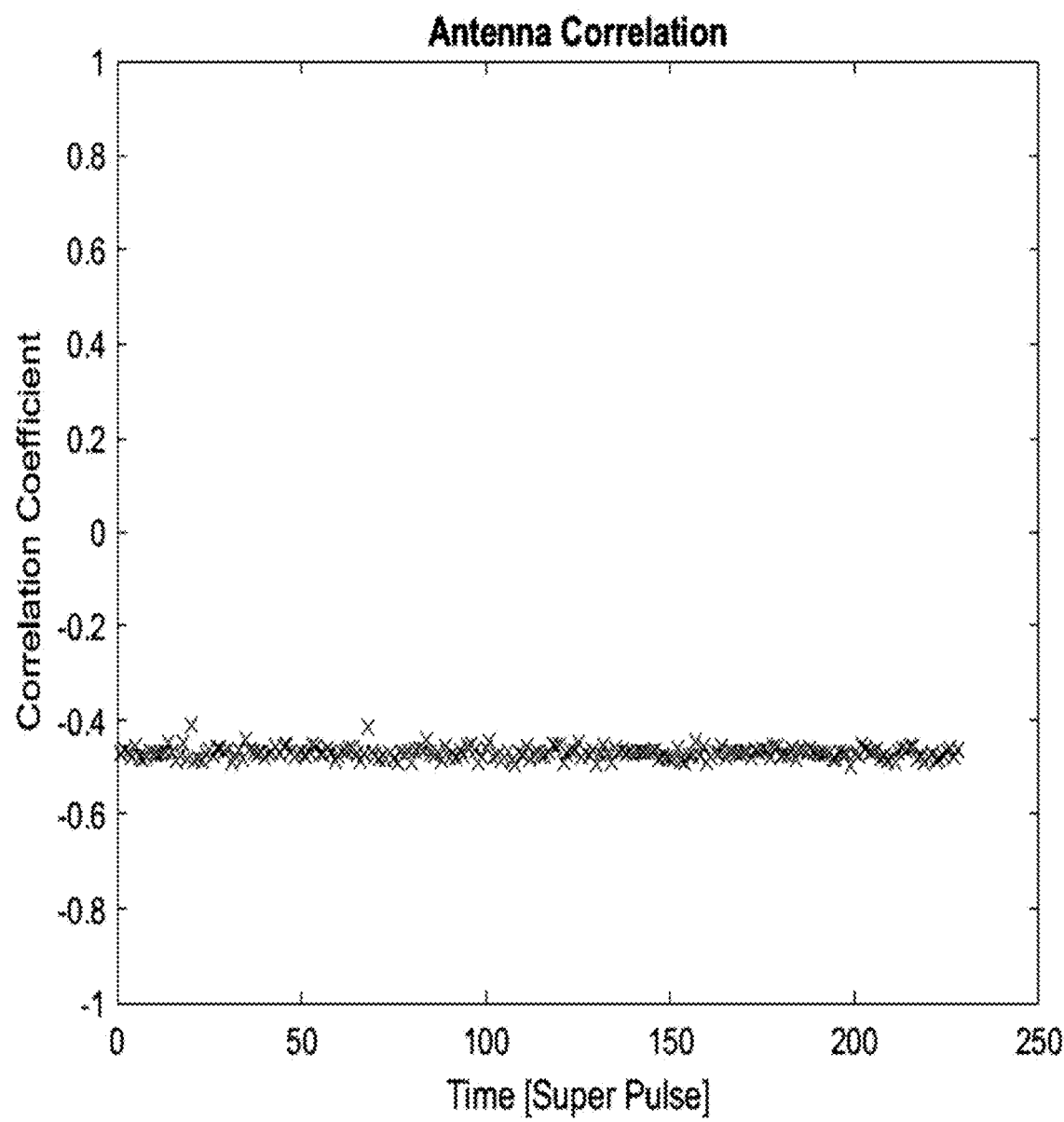
Figure 9D:
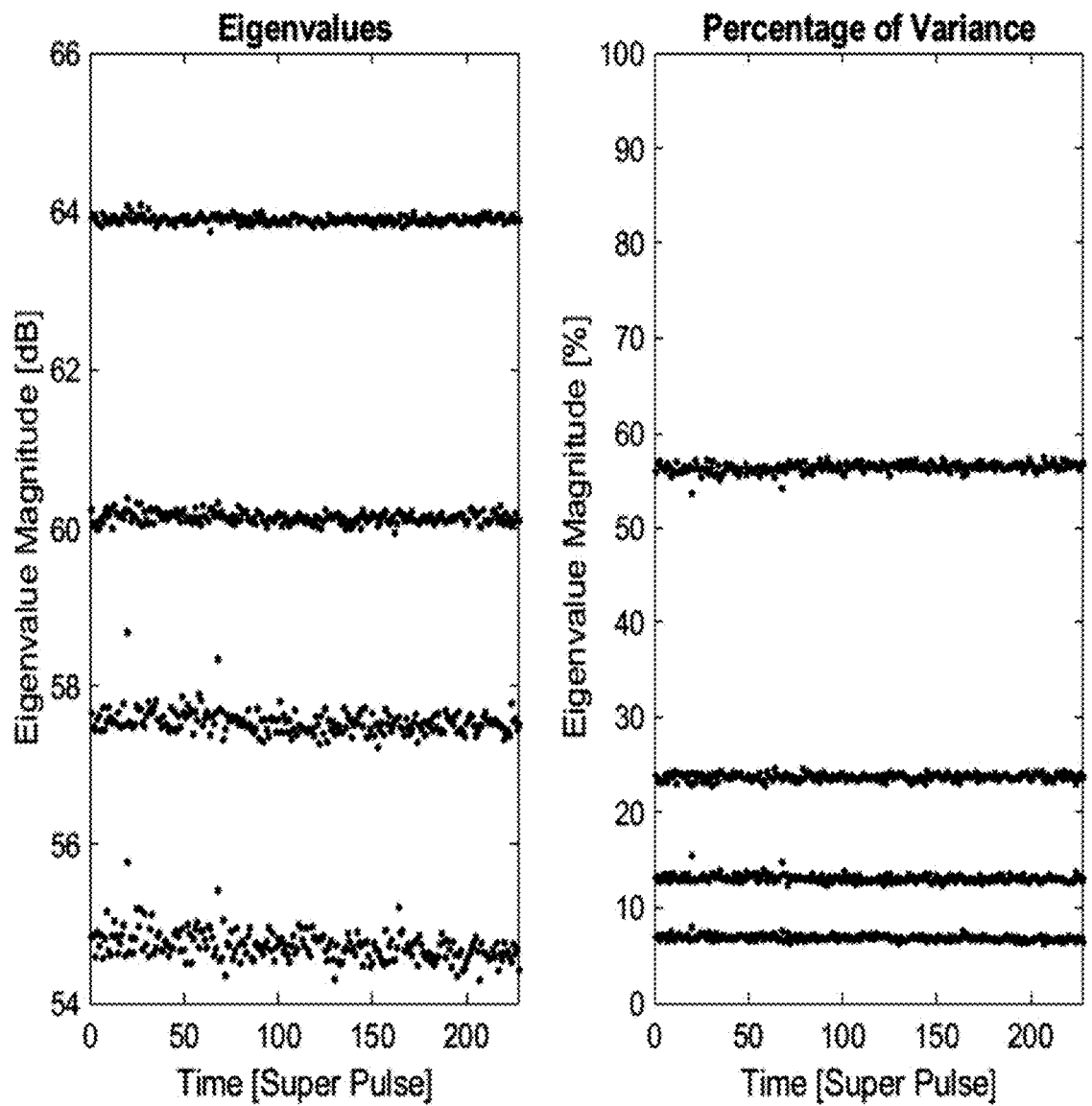
Figure 9E:
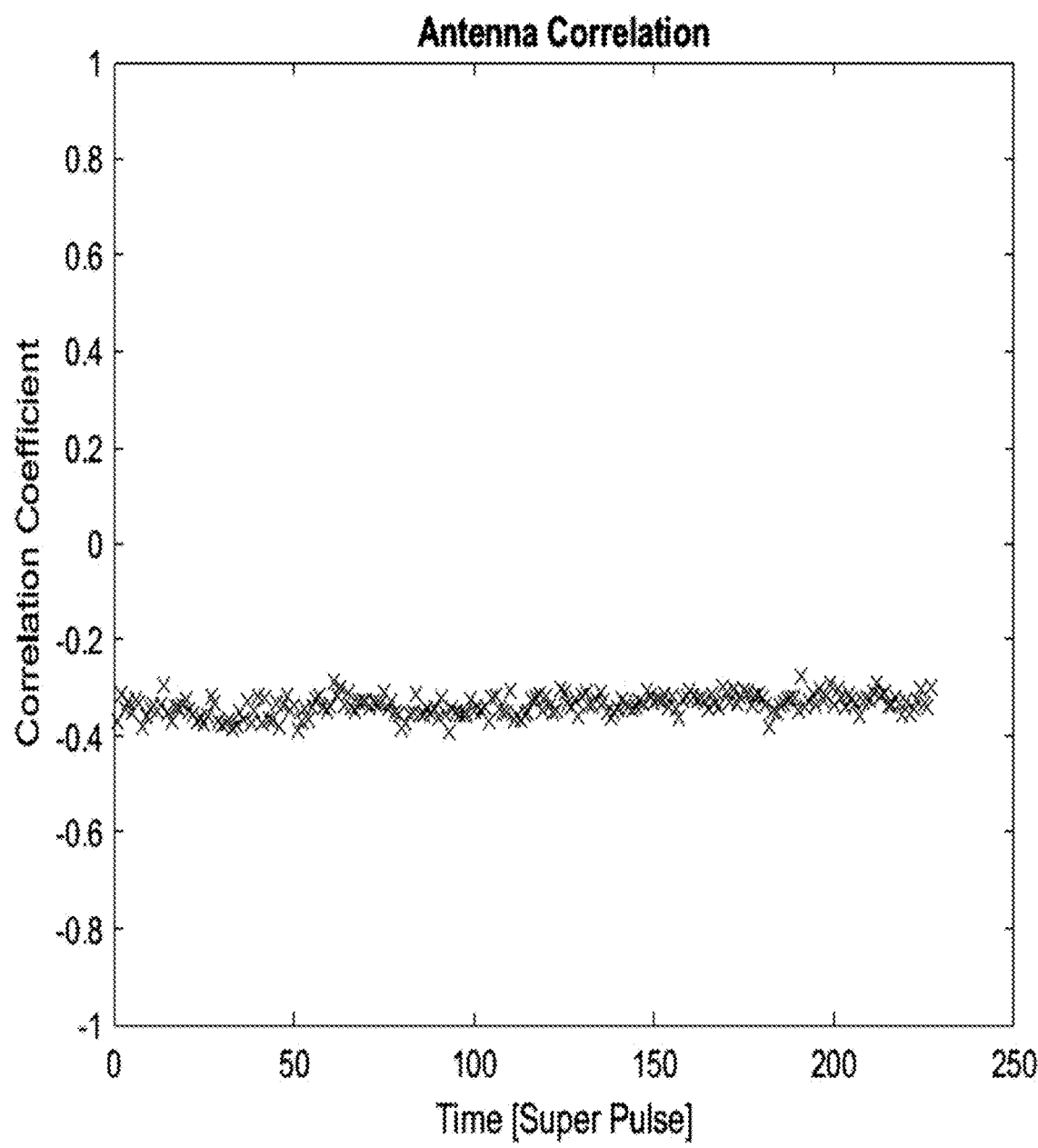
Figure 9F:
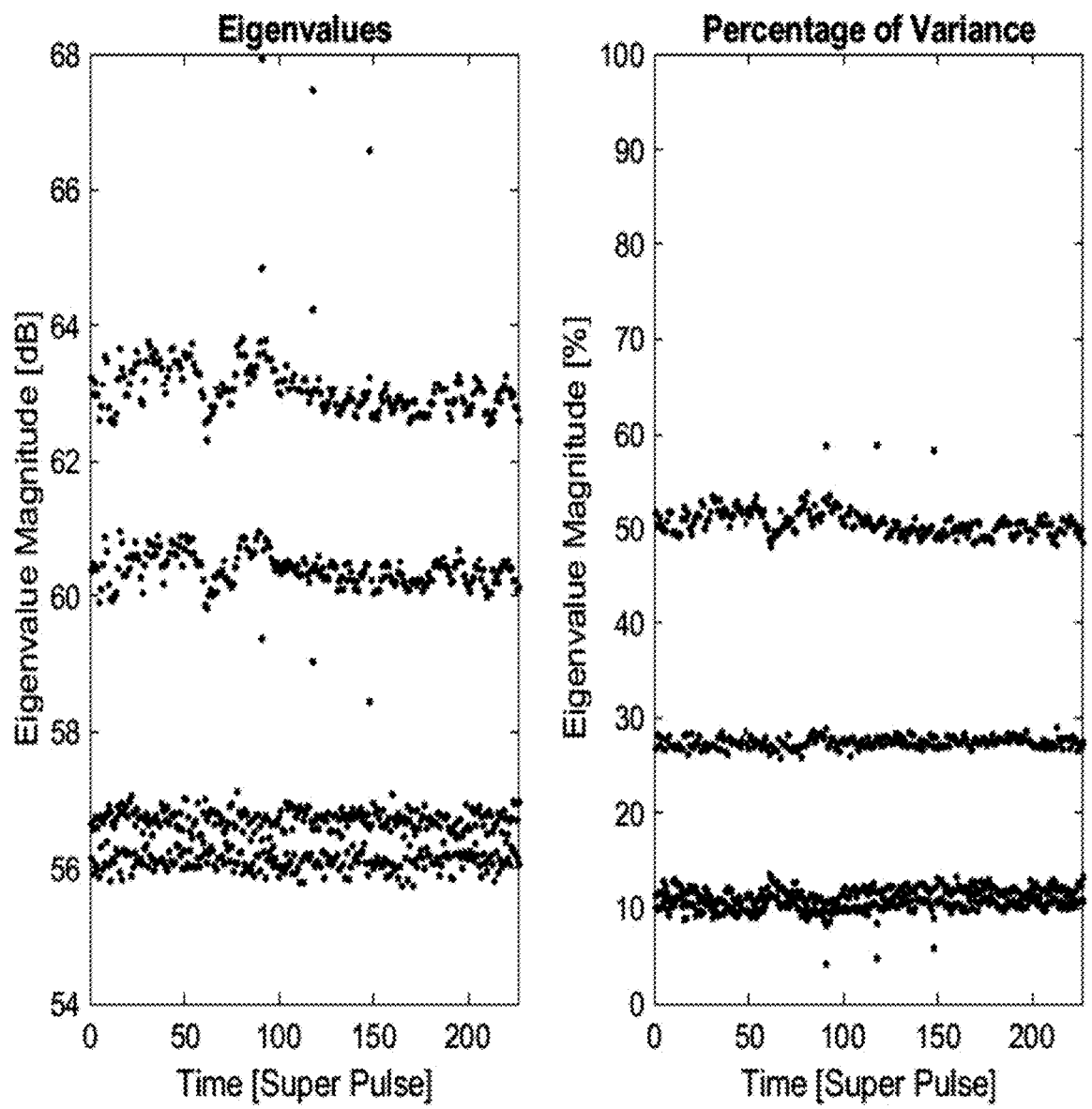
Figure 9G:
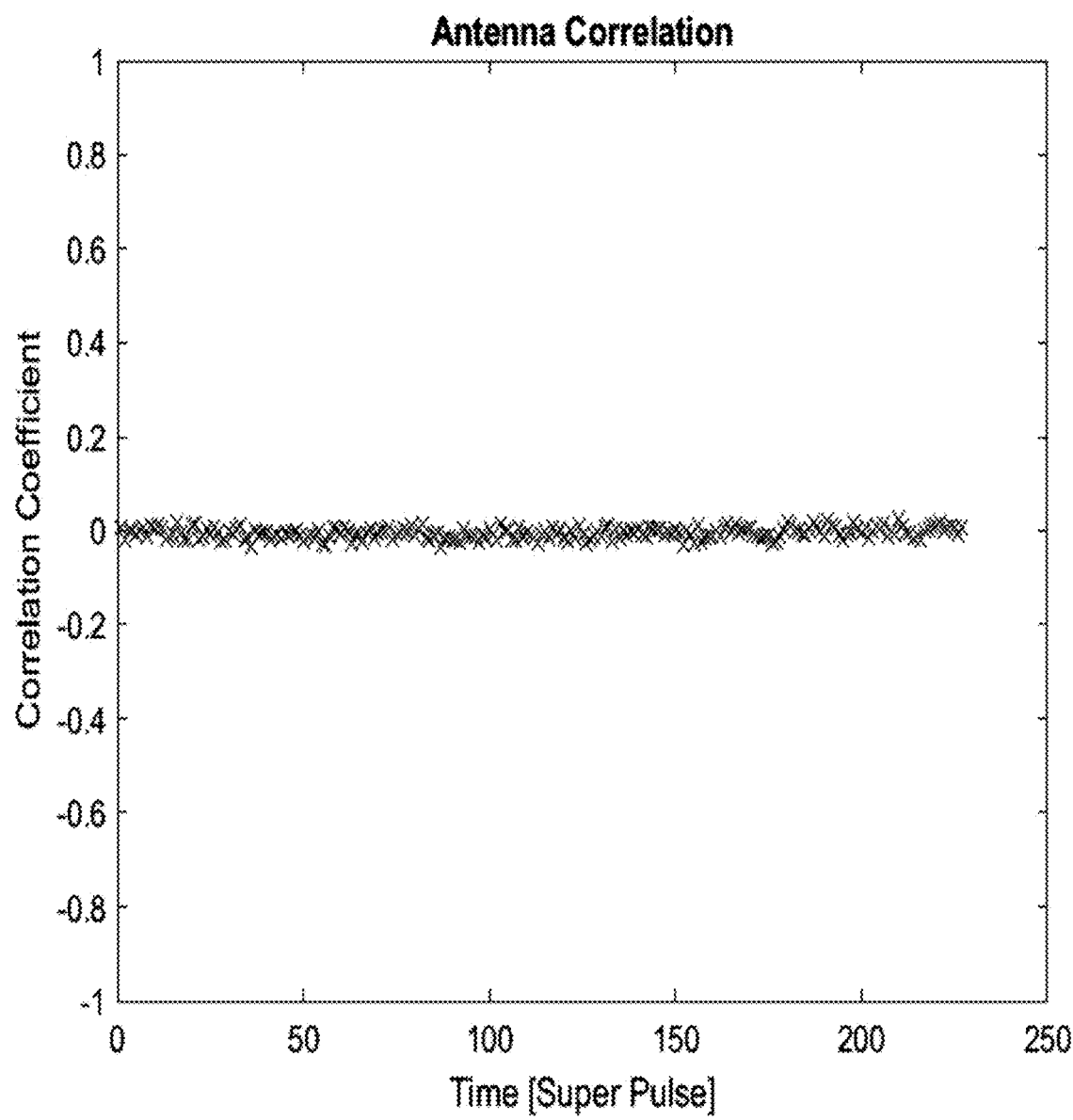
Figure 9H:
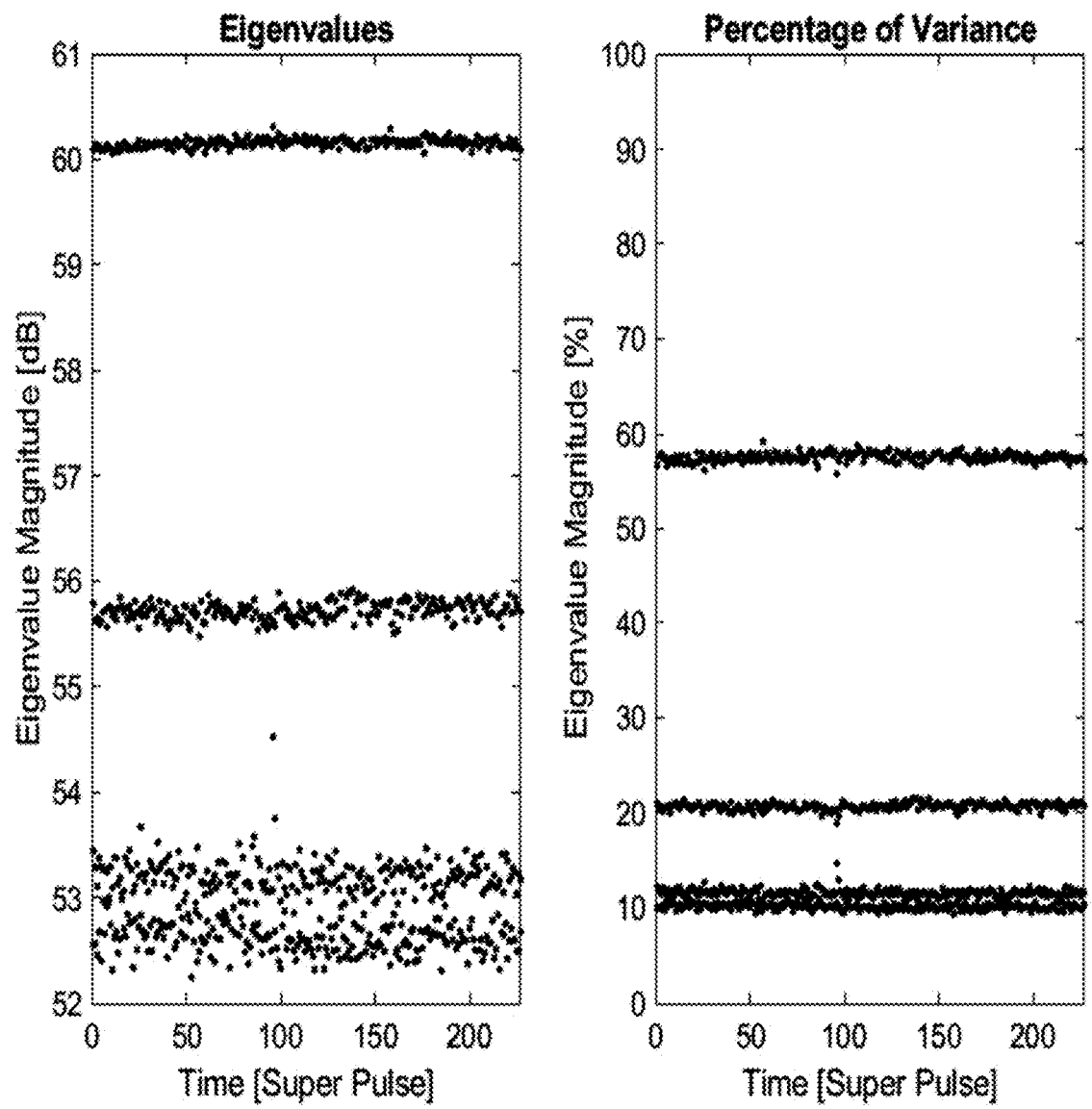
Figure 10A:
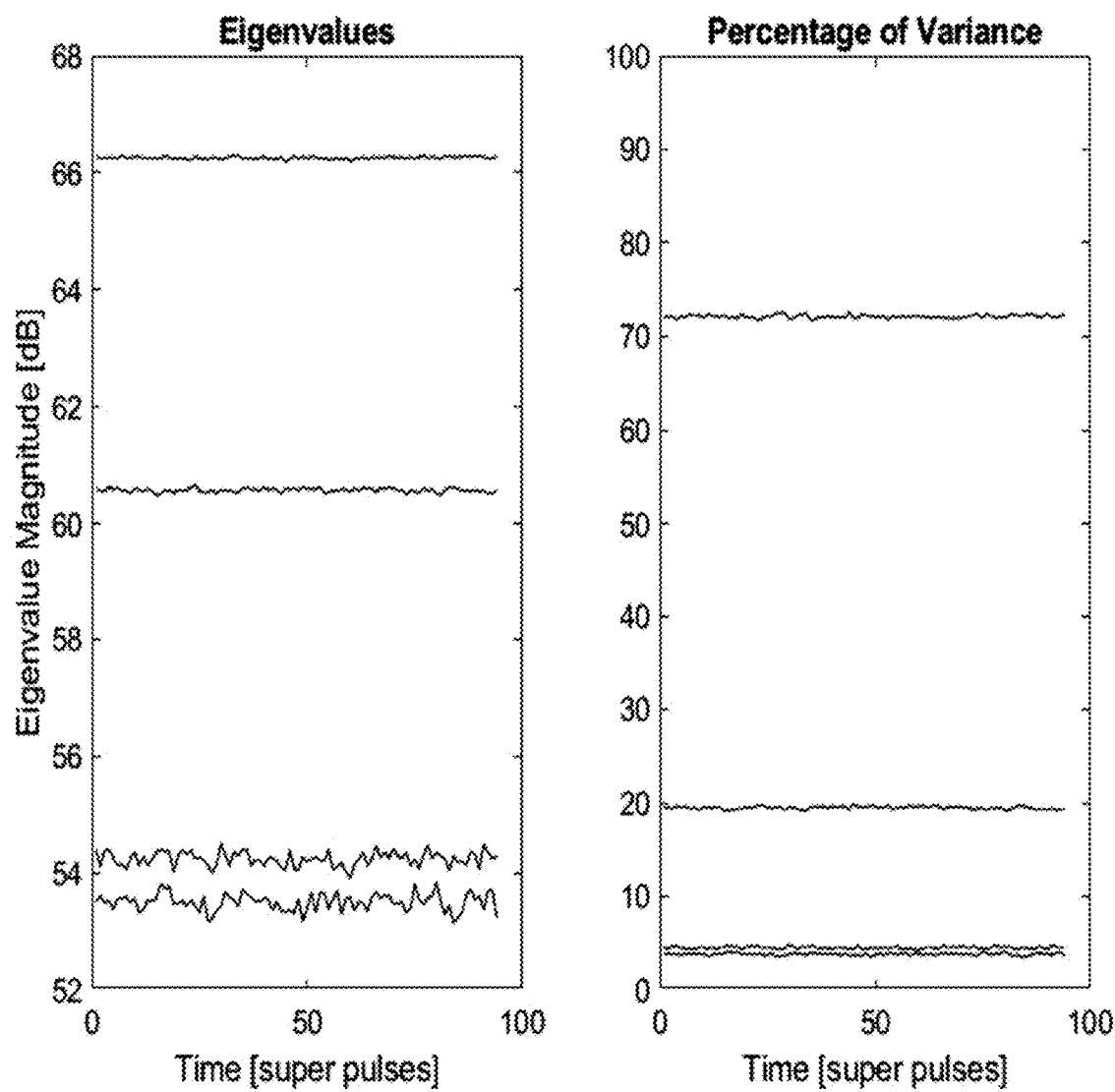
FIGS. 10A, 10B, 10C, 10D include plots of four eigenvalues and their percentage of variance over time, i.e., over cycle or pulses, wherein each cycle is nominally 50 msec in duration, for four different sensors on a single vehicle, in a particular operational scenario, generated according to exemplary embodiments.
Figure 10B:
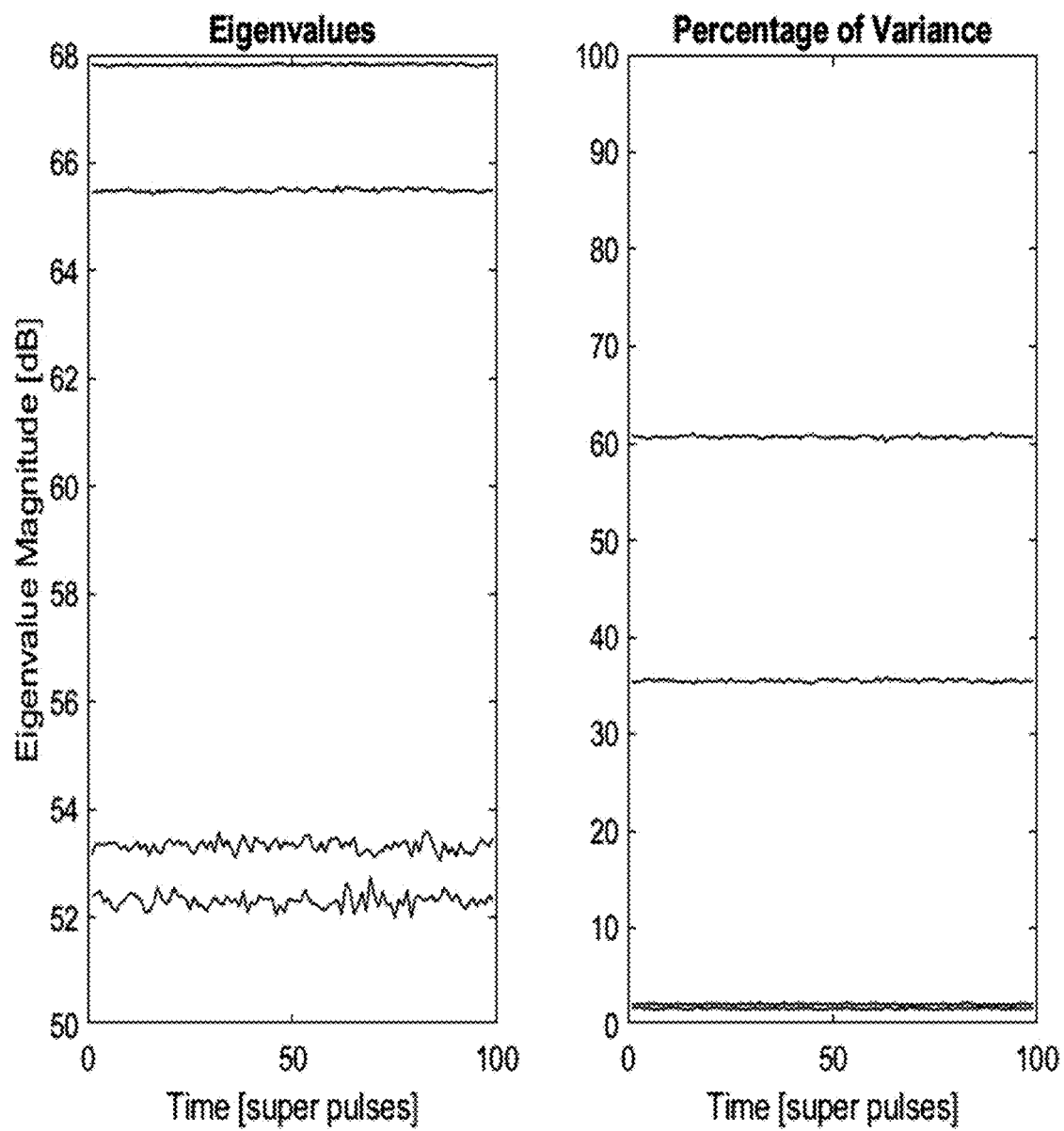
Figure 10C:
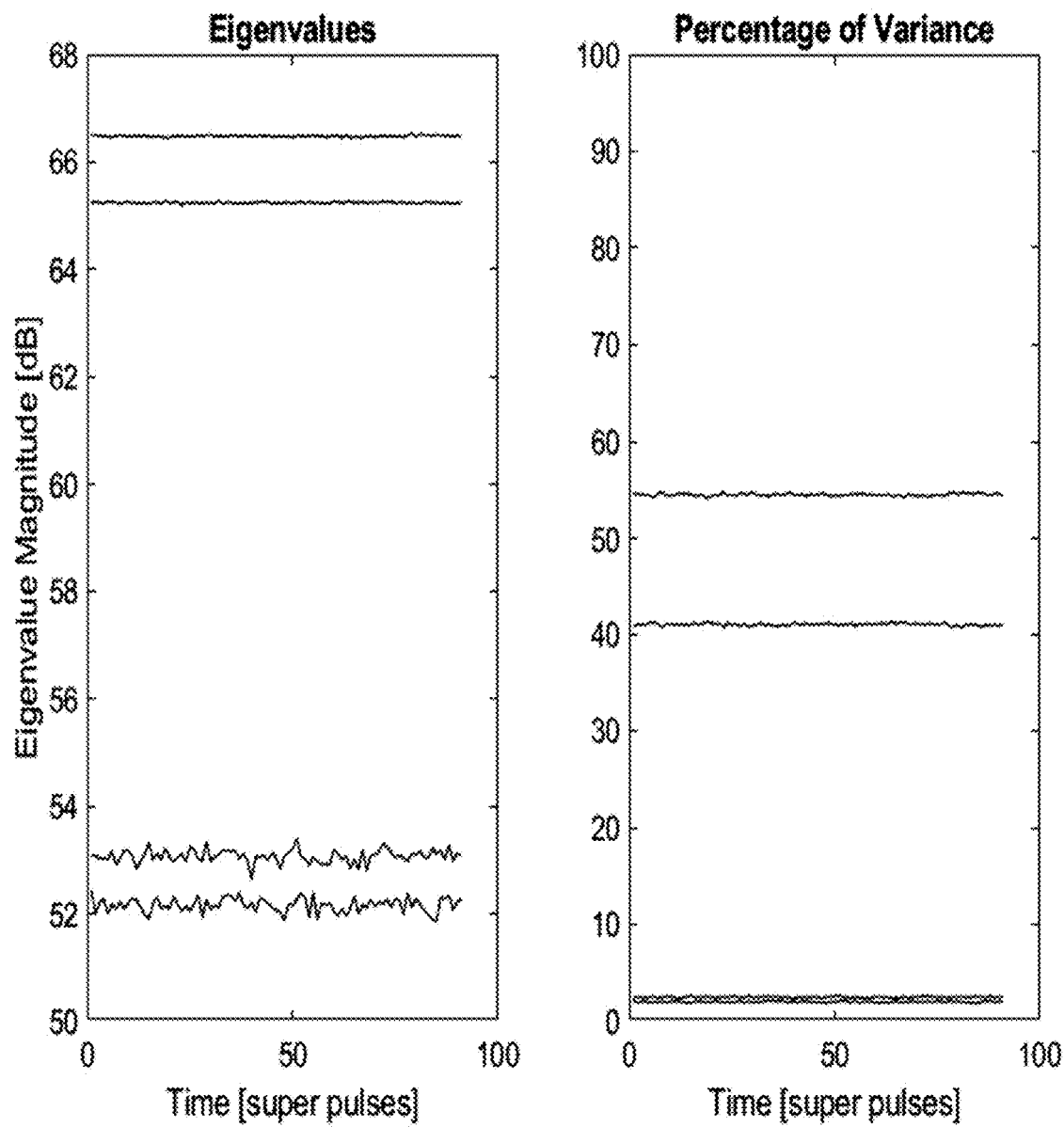
Figure 10D:
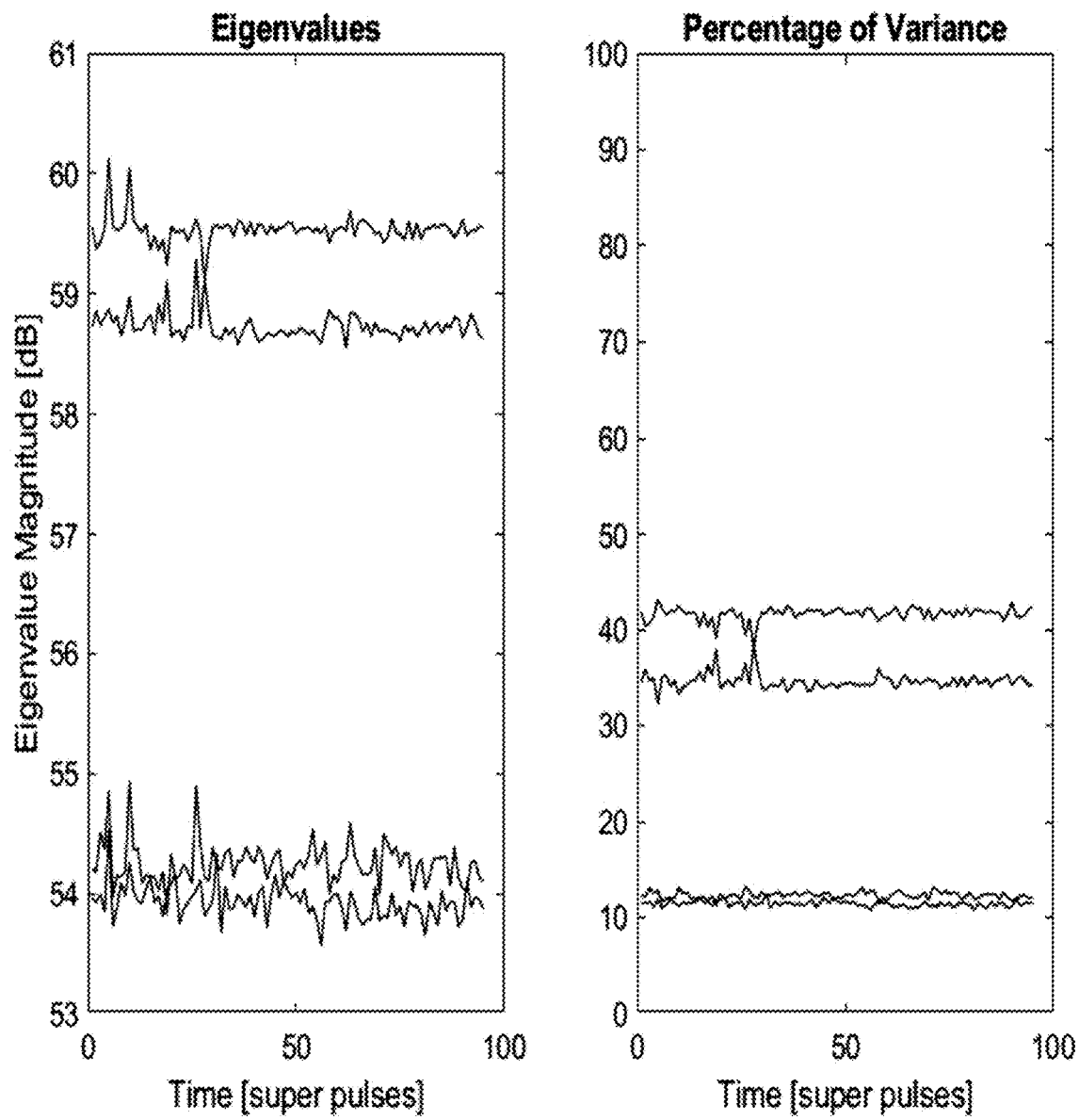

FIGS. 9A-9H include plots of correlation coefficient and four eigenvalues and their percentage of variance over time, i.e., over cycle or pulses, wherein each cycle is nominally 50 msec in duration, in a particular operational scenario, generated according to exemplary embodiments. The operational scenario represented by FIGS. 9A-9H is sensor unblocked while non-moving in a sparse environment, i.e., an environment with few or no targets. Each pair of plots in FIGS. 9A-9H is from a single sensor on the vehicle. Specifically, FIGS. 9A and 9B are for a front left sensor, FIGS. 9C and 9D are for a front right sensor, FIGS. 9E and 9F are for a rear left sensor, and FIGS. 9G and 9H are for a rear right sensor. These plots show what the sensors on each of the vehicle corners see while the vehicle is stopped in the middle of a very smooth test track with no objects within range of the sensors.

FIGS. 10A, 10B, 10C, 10D include plots of four eigenvalues and their percentage of variance over time, i.e., over cycle or pulses, wherein each cycle is nominally 50 msec in duration, for four different sensors on a single vehicle, in a particular operational scenario, generated according to exemplary embodiments. The operational scenario represented by FIGS. 10A-10D is sensor completely blocked, i.e., 60 dB of blockage, while moving in a dense environment.

It is noted that in the plots of FIGS. 10A-10D, the two highest eigenvalues account for 90% or more of the variance. Also, the separation between the third and fourth eigenvalues is less than 1 dB. Thus, these characteristics of the eigenvalues are used according to the present disclosure in making the blockage determination. That is, for example, if the percentage of variance accountable to the first two eigenvalues exceed a certain threshold, e.g., 85% or 90%, and the separation between the third and fourth eigenvalues is less than a certain predetermined threshold, e.g., 1 dB, then it can be concluded that the sensor is completely blocked.

Figure 11A:
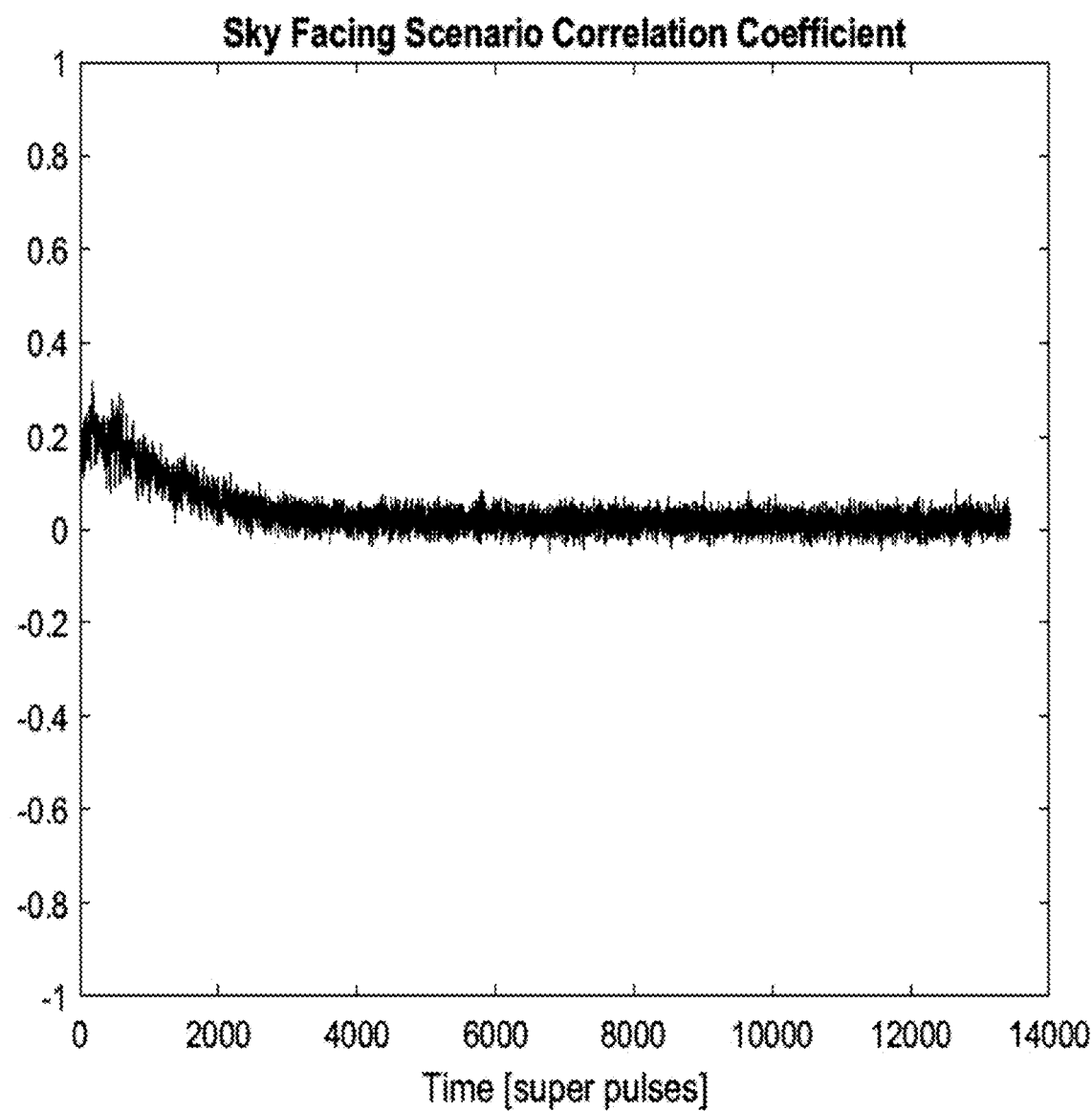
FIGS. 11A and 11B include plots of correlation coefficient and four eigenvalues and their percentage of variance over time, i.e., over cycle or pulses, wherein each cycle is nominally 50 msec in duration, in a particular operational scenario, generated according to exemplary embodiments.
Figure 11B:
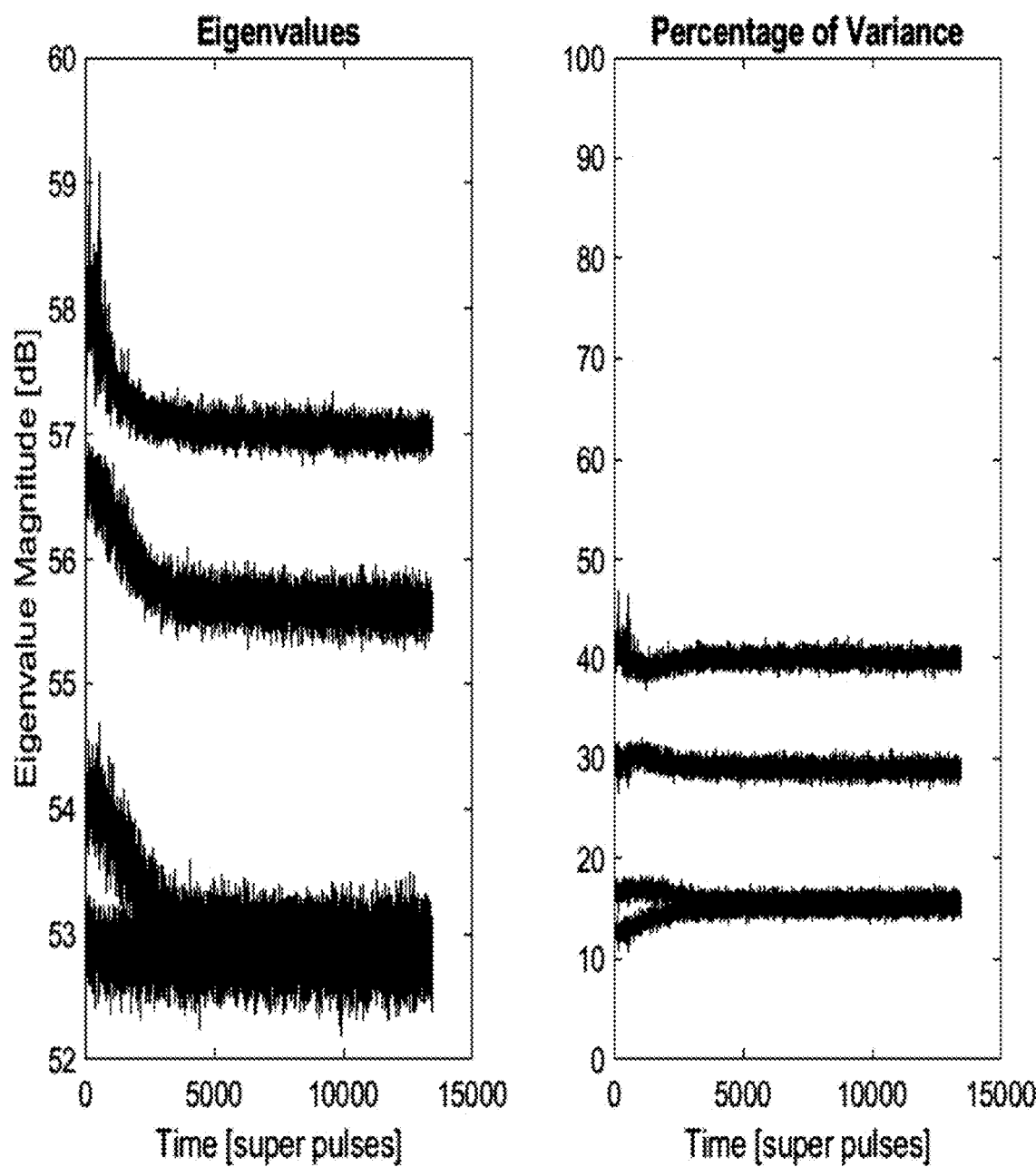

FIGS. 11A and 11B include plots of correlation coefficient and four eigenvalues and their percentage of variance over time, i.e., over cycle or pulses, wherein each cycle is nominally 50 msec in duration, in a particular operational scenario, generated according to exemplary embodiments. The operational scenario of FIGS. 11A and 11B is a simulated target in the form of a drone above the vehicle with the vehicle-mounted sensor being directed at the drone, i.e., the sky-facing scenario, with the sensor unblocked. Over time, as illustrated in the plots, the drone increases in height until the scenario becomes a true sky-facing scenario in the absence of a target. As the drone leaves the scene, the correlation coefficient settles to zero. Also, as the drone leaves, the third and fourth eigenvalues converge such that there is little or no difference between them.

Figure 12A:
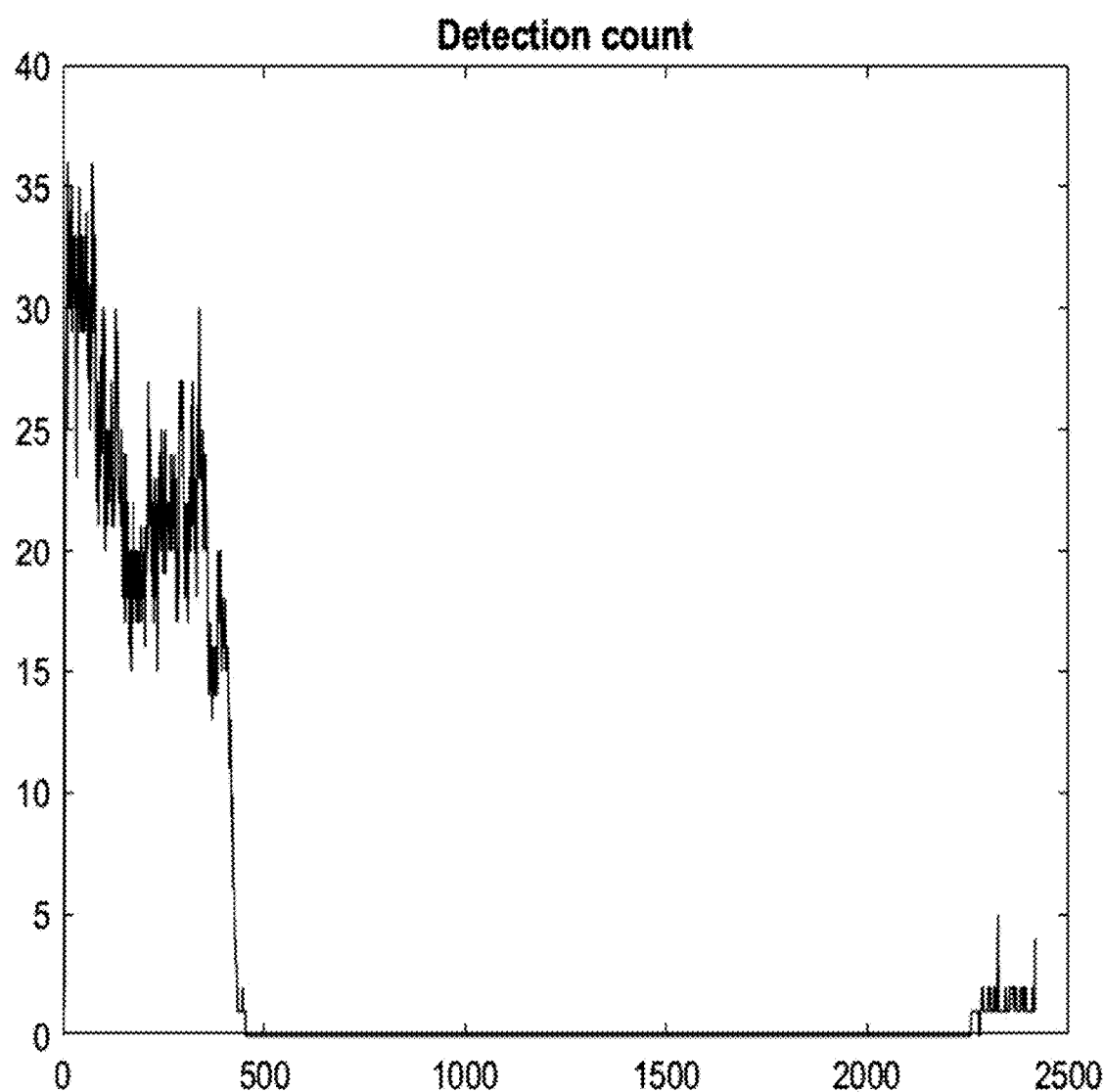
FIGS. 12A, 12B and 12C include plots of correlation coefficient and four eigenvalues and their percentage of variance over time, i.e., over cycle or pulses, wherein each cycle is nominally 50 msec in duration, in a particular operational scenario, generated according to exemplary embodiments.
Figure 12B:
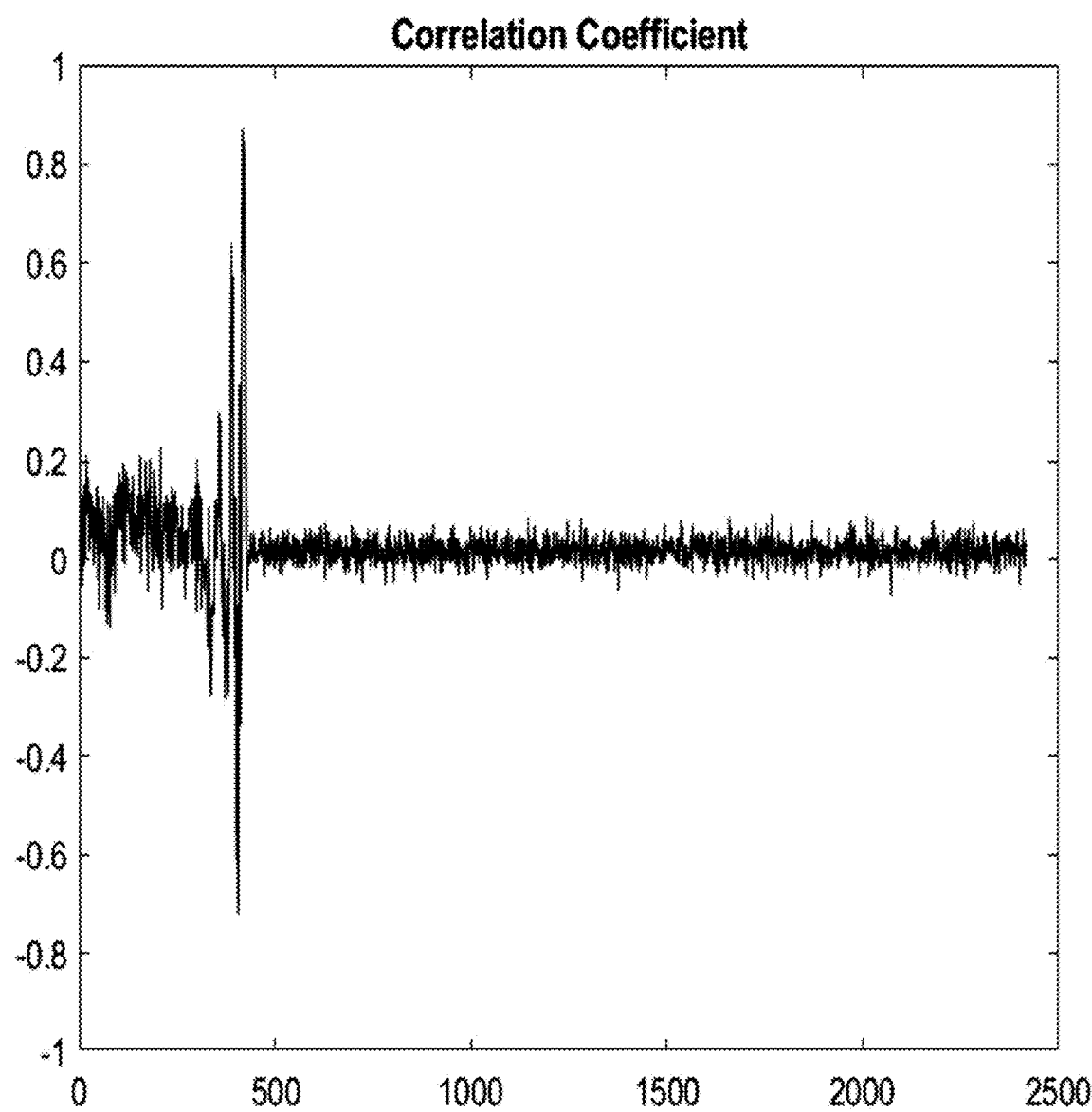
Figure 12C:
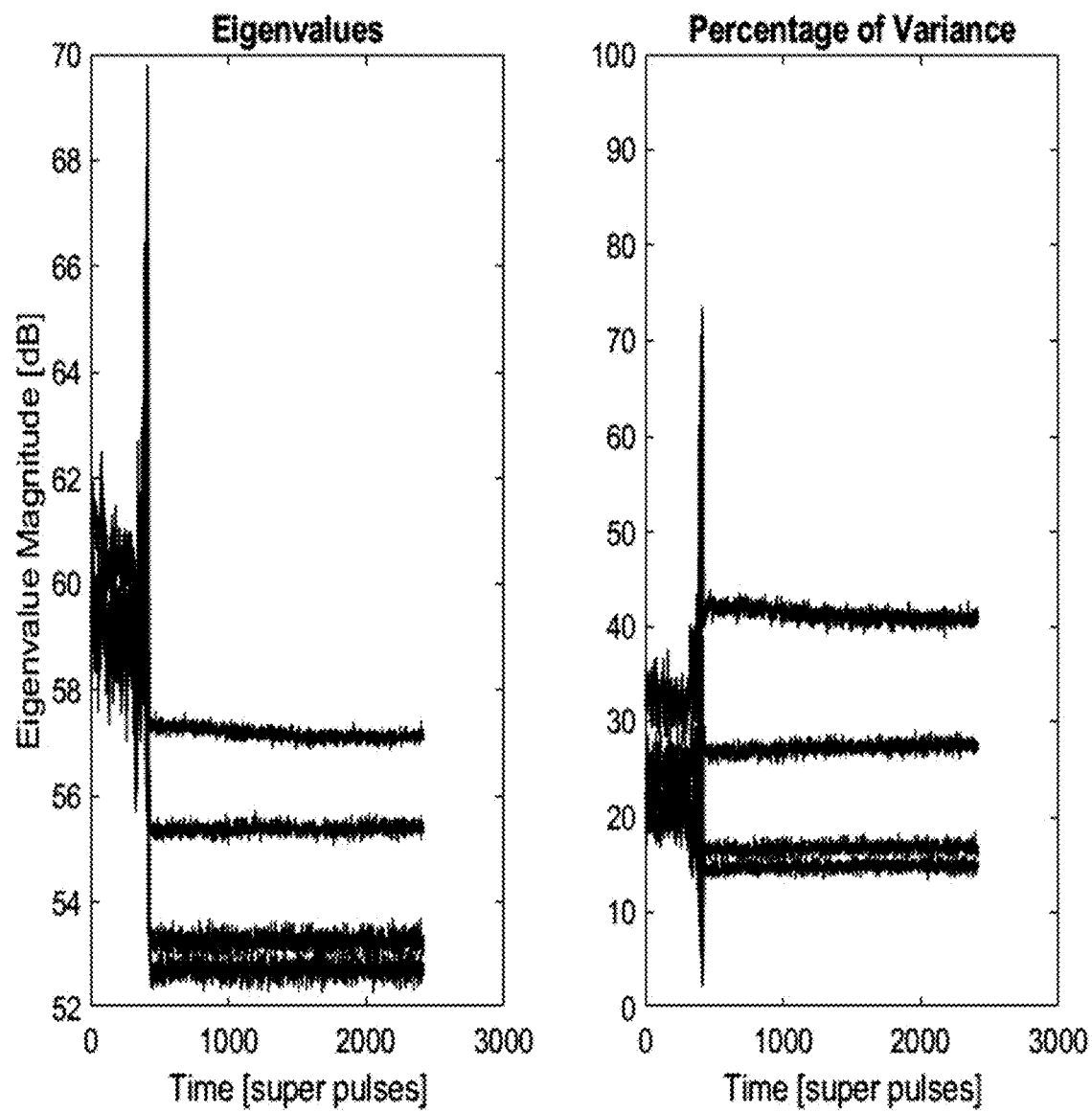

FIGS. 12A, 12B and 12C include plots of correlation coefficient and four eigenvalues and their percentage of variance over time, i.e., over cycle or pulses, wherein each cycle is nominally 50 msec in duration, in a particular operational scenario, generated according to exemplary embodiments. The operational scenario is a variation in the cliff scenario in which the host vehicle approaches a cliff with the sensor facing forward. The plots of FIGS. 12A-12C show that the number of detections drops to zero when the vehicle stops and faces outward from the cliff. When the vehicle stops and the detections drop to zero, the correlation coefficients and eigenvalues both become stationary.

Figure 13:
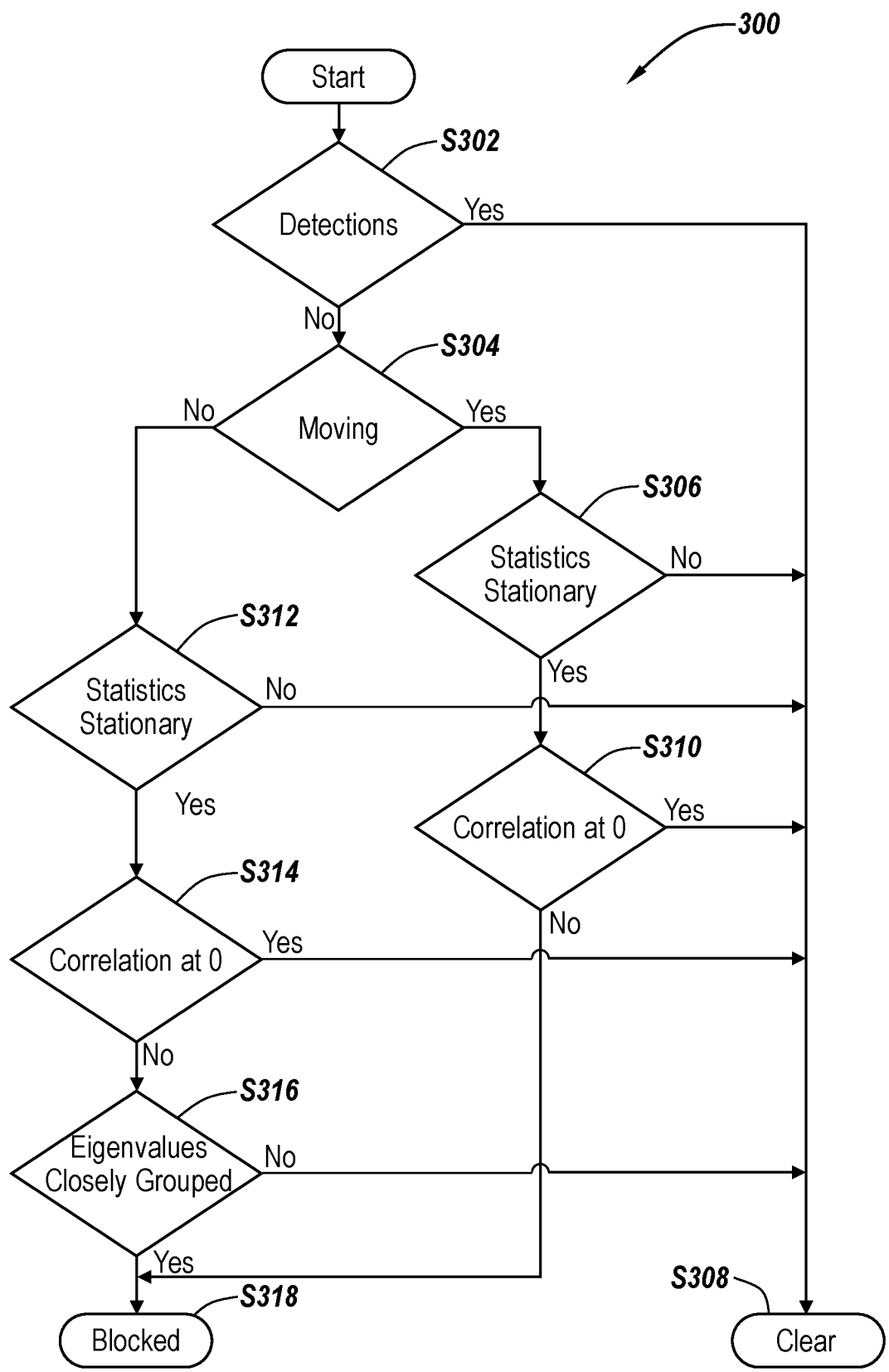
FIG. 13 includes a schematic logical flow diagram illustrating the logical flow of a process 300 of determining RADAR sensor blockage, according to some exemplary embodiments.

FIG. 13 includes a schematic logical flow diagram illustrating the logical flow of a process 300 of determining RADAR sensor blockage, according to some exemplary embodiments. Referring to FIG. 13, in step S302, a determination is made as to whether detections are occurring. If so, then the sensor is declared clear in step S308. If not, then a determination is made in step S304 as to whether the vehicle is moving. This indication can be provided, for example, by a motion detector or speed detector in the vehicle. If the vehicle is moving, then a determination is made in step S306 as to whether the statistics, i.e., the correlation coefficient and/or eigenvalues as described above, are stationary. If they are not stationary, then the sensor is declared clear in step S308. If the statistics are determined to be stationary in step S306, then a determination is made in step S310 as to whether the correlation coefficient is at zero. If so, then the sensor is declared clear in step S308. If the correlation coefficient is determined not to be at zero in step S310, then the sensor is declared blocked in step S318.

Continuing to refer to FIG. 13, if it is determined in step S304 that the vehicle is not moving, then a determination is made in step S312 as to whether the statistics are stationary. If not, then the sensor is declared clear in step S308. If so, then a determination is made in step S314 as to whether the correlation coefficient is at zero. If so, then the sensor is declared clear in step S308. If not, then a determination is made in step S316 as to whether the eigenvalues are closely grouped, as described above. If not, then the sensor is declared clear in step S308. If so, then the sensor is declared blocked in step S318.

Figure 14:
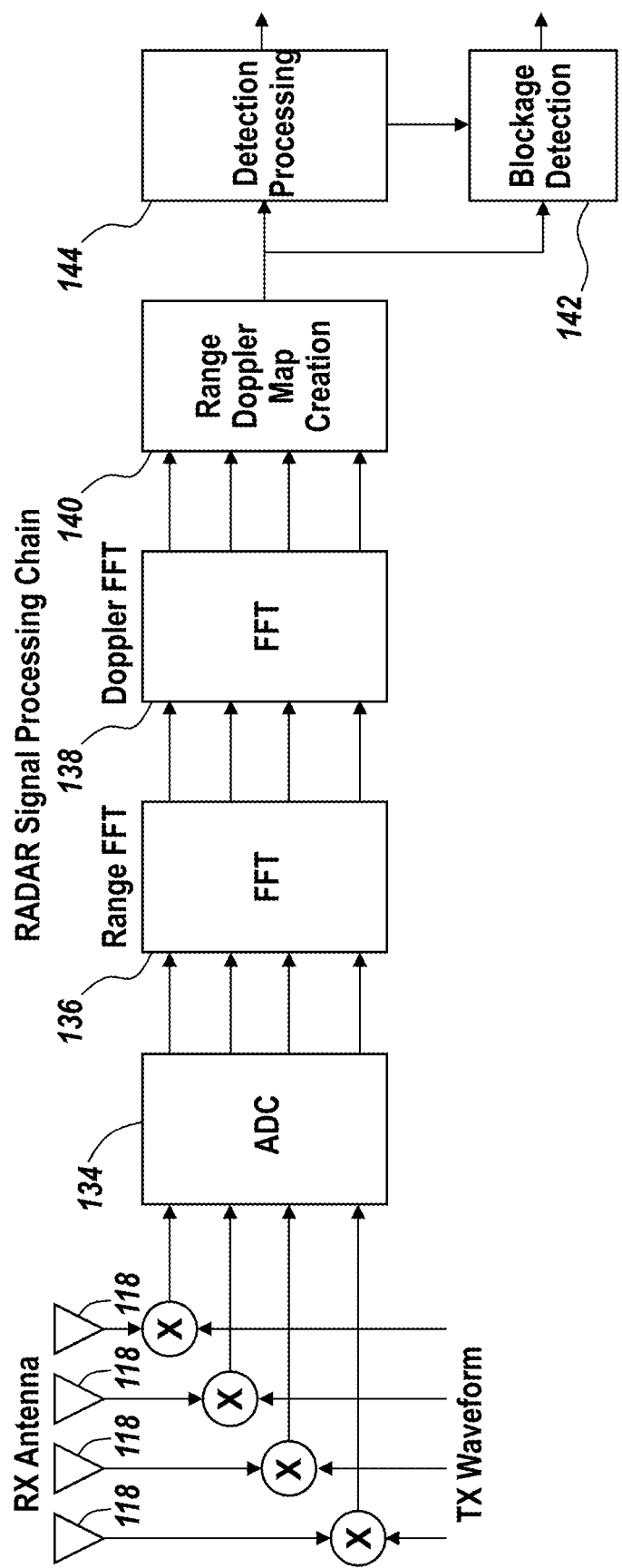
FIG. 14 includes a schematic functional block diagram of a RADAR sensor blockage detection architecture in a prior RADAR system.

FIG. 14 includes a schematic functional block diagram of a RADAR sensor blockage detection architecture in a prior RADAR system 100. Referring to FIG. 14, RADAR system 100 includes receive antennas 118 which forward the received signals to mixers 120, where they are mixed with the transmit waveform to demodulate the incoming waveform to baseband. The baseband signals are converted to digital signals in ADC 134, which forwards the digital received signals for processing in processor circuitry which includes a first FFT module 136, which carries out a range FFT on the data, and a second FFT module 138, which carries out a Doppler FFT on the data. The FFT results are used to create a range-Doppler map 140, which is analyzed by detection processing module 144 to generate target detections from the data. Blockage detection module 142 uses detections, or lack of detections, from detection processing module 144, along with the range Doppler map data to determine whether the RADAR sensor is blocked.

Figure 15:
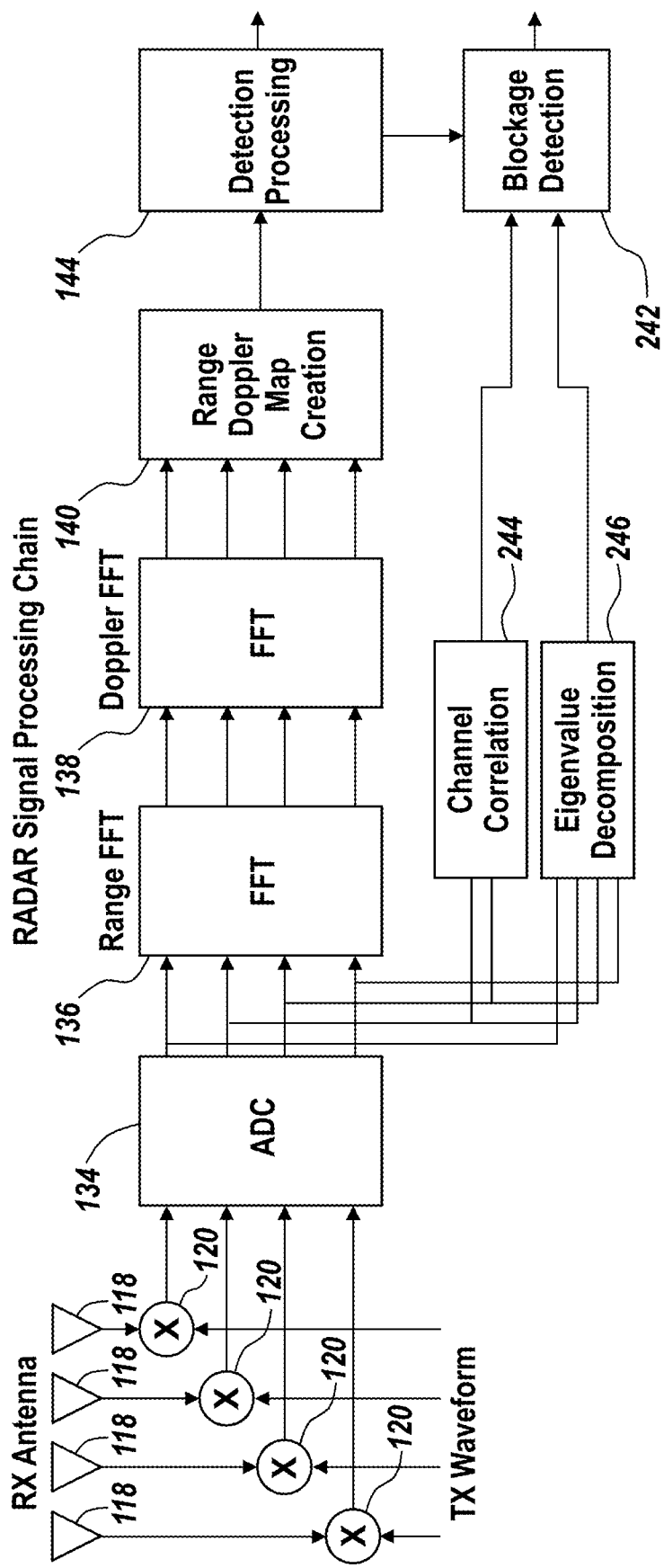
FIG. 15 includes a schematic functional block diagram of a RADAR sensor blockage detection architecture of a RADAR system, according to some exemplary embodiments.

FIG. 15 includes a schematic functional block diagram of a RADAR sensor blockage detection architecture of a RADAR system 200, according to some exemplary embodiments. Referring to FIG. 15, many of the elements of RADAR system 200 are the same as like elements of RADAR system 100 described above. These like elements include receive antennas 118, mixers 120, ADC 134, first (range) FFT module 136, second (Doppler) FFT module 138, range-Doppler map creation module 140, and blockage detection module 142. Description of these like elements will not be repeated.

Referring to FIG. 15, in system 200 of the exemplary embodiments, blockage detection module 242 uses information from detection processing module 144, such as presence or absence of detections, as part of the blockage determination, as described above in detail. The blockage determination also uses output of channel correlation module 244, which performs the correlation analysis described above in detail, and eigenvalue decomposition module 246, which performs the eigenvalue analysis described above in detail, in generating a determination as to whether blockage is present.

Continuing to refer to FIG. 15, the blockage determination approach of the present disclosure performs analysis at the front end of the sensor, i.e., on the outputs of ADC 134, based on statistics of the received digitized antenna signals. In contrast, in prior system 100, the blockage determination is performed post-detection. Thus, in prior system 100, significant processing delay is present, as opposed to the approach used in system 200 of the present disclosure.

Figure 16:
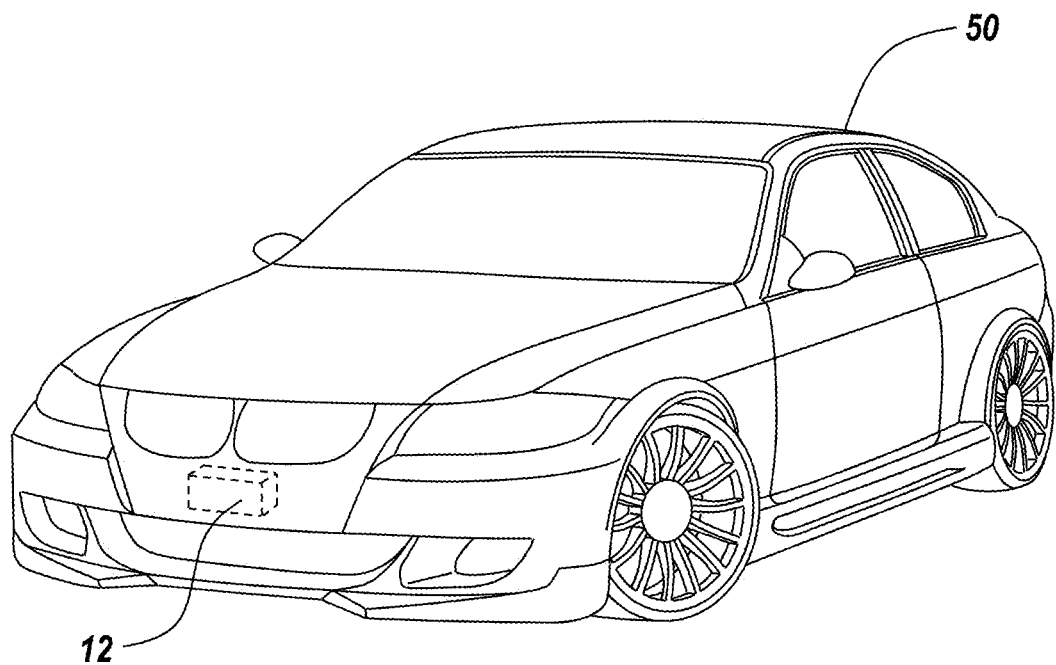
FIG. 16 includes a schematic perspective view of an automobile, equipped with one or more radar systems, including one or more radar sensor modules, according to exemplary embodiments.

FIG. 16 includes a schematic perspective view of an automobile 50, equipped with one or more radar systems 10, including one or more radar sensor modules 12, described herein in detail, according to exemplary embodiments. Referring to FIG. 16, it should be noted that, although only a single radar sensor module 12 is illustrated, it will be understood that multiple radar sensor modules 12 according to the exemplary embodiments can be used in automobile 50. Also, for simplicity of illustration, radar sensor module 12 is illustrated as being mounted on or in the front section of automobile 50. It will also be understood that one or more radar sensor modules 12 can be mounted at various locations on automobile 50, including at the rear of automobile 50.

Figure 17:
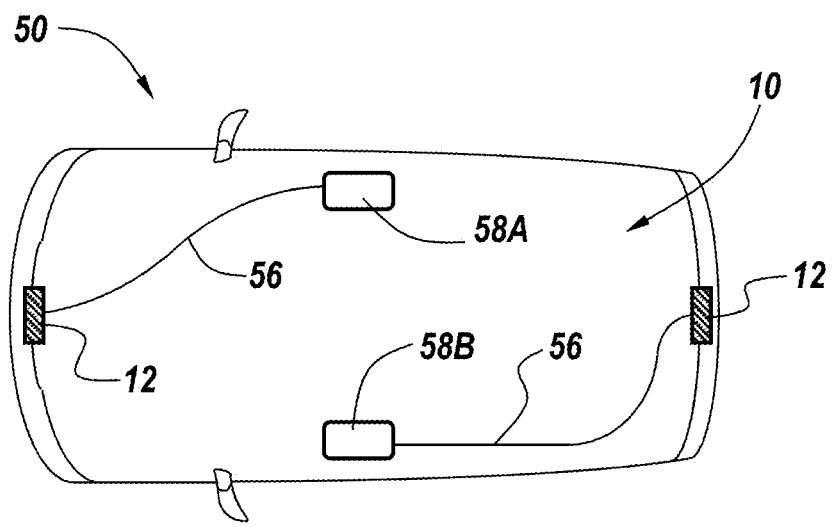
FIG. 17 includes a schematic top view of automobile equipped with two radar sensor modules, as described above in detail, according to exemplary embodiments.

FIG. 17 includes a schematic top view of automobile 50 equipped with two radar sensor modules 12, as described above in detail, according to exemplary embodiments. In the particular embodiments illustrated in FIG. 17, a first radar sensor module 12 is connected via a bus 56, which in some embodiments can be a standard automotive controller area network (CAN) bus, to a first CAN bus electronic control unit (ECU) 58A. Detections generated by the processing described herein in detail in radar sensor module 12 can be reported to ECU 58A, which processes the detections and can provide detection alerts via CAN bus 56. Similarly, in some exemplary embodiments, a second radar sensor module 12 is connected via CAN bus 56 to a second CAN bus electronic control unit (ECU) 58B. Detections generated by the radar processing described herein in detail in radar sensor module 12 can be reported to ECU 58B, which processes the detections and can provide detection alerts via CAN bus 56. It should be noted that this configuration is exemplary only, and that many other automobile radar system configurations within automobile 50 can be implemented. For example, a single ECU can be used instead of multiple ECUs. Also, the separate ECUs can be omitted altogether.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A radar system with blockage detection, comprising:
 a first antenna for receiving first signals;
 a second antenna for receiving second signals;
 input circuitry for processing the first signals to generate first input signals and for processing the second signals to generate second input signals; and
 a processor configured to compute a correlation coefficient between the first input signals and the second input signals, to determine a variation in the correlation coefficient, and, to generate a determination as to whether the radar system is blocked using the variation in the correlation coefficient.

2. The radar system of claim 1, wherein the correlation coefficient is a Pearson correlation coefficient.

3. The radar system of claim 1, wherein, if the variation in the correlation coefficient is below a threshold, then the determination is that the radar system is blocked.

4. The radar system of claim 1, wherein the radar system is an automotive radar system.

5. The radar system of claim 1, wherein the first antenna, second antenna, input circuitry and processor are housed within a housing of an automotive radar sensor module.

6. The radar system of claim 1, wherein the first antenna and second antenna comprise patch antenna arrays.

7. The radar system of claim 1, wherein the input circuitry comprises:
 a first mixer for generating first mixed signals;
 a second mixer for generating second mixed signals;
 a first analog-to-digital converter (ADC) for converting the first mixed signals to the first input signals; and
 a second ADC for converting the second mixed signals to the second input signals.

* * * * *